US011456990B2

(12) United States Patent
Qian et al.

(10) Patent No.: US 11,456,990 B2
(45) Date of Patent: Sep. 27, 2022

(54) MANAGING CONNECTION STRENGTHS USING ALLIANCE DATA

(71) Applicant: Project Affinity, Inc., San Francisco, CA (US)

(72) Inventors: Hansen Qian, San Francisco, CA (US); Gabriel Fan, Mountain View, CA (US); Ray Zhou, San Francisco, CA (US); Shubham Goel, San Francisco, CA (US)

(73) Assignee: PROJECT AFFINITY, INC., San Francisco, CA (US)

( * ) Notice: Subject to any disclaimer, the term of this patent is extended or adjusted under 35 U.S.C. 154(b) by 154 days.

(21) Appl. No.: 16/395,119

(22) Filed: Apr. 25, 2019

(65) Prior Publication Data

US 2020/0344202 A1 Oct. 29, 2020

(51) Int. Cl.
*H04L 67/306* (2022.01)
*H04L 61/4594* (2022.01)
*H04L 67/55* (2022.01)

(52) U.S. Cl.
CPC ........ *H04L 61/4594* (2022.05); *H04L 67/306* (2013.01); *H04L 67/55* (2022.05)

(58) Field of Classification Search
CPC ............. G06F 16/24578; G06F 16/248; G06F 16/90324; G06F 16/9535; G06F 16/24575; G06F 16/73; H04L 51/16; H04L 51/32; H04L 67/306; H04L 43/04; H04L 51/20; H04L 67/26; H04L 67/22; H04L 63/102; H04L 67/02; H04L 61/1594;

(Continued)

(56) References Cited

U.S. PATENT DOCUMENTS 8,386,619 B2  2/2013  Mallet
8,392,526 B2  3/2013  Mallet
(Continued)

OTHER PUBLICATIONS

Reid Hoffman, "Allies and Acquaintances: Two Key Types of Professional Relationships", Nov. 26, 2012, Linkedin, Retrieved online on Jan. 28, 2021 from URL https://www.linkedin.com/pulse/20121126205355-1213-allies-and-acquaintances-two-key-types-of-professional-relationships. (Year: 2012).*

(Continued)

*Primary Examiner* — Dhairya A Patel
*Assistant Examiner* — Sandarva Khanal
(74) *Attorney, Agent, or Firm* — Hickman Becker Bingham Ledesma LLP

(57) ABSTRACT

A communication management server computer that manages alliances is programmed or configured to monitor a target strength associated with a user account, which can be an alliance strength of an alliance with an ally of the user account or a relationship strength of a relationship with a contact of the user account. The server is programmed to further take a remedial measure when the monitored target strength deteriorates significantly. The server is programmed to determine the remedial measure based on alliance data, including the set of digital communications shared by the user account or another user account for exploration of relationships. The remedial measure can lead to actions taken by a specific user account that is connected to the user account and the ally or the contact through one or more alliances or relationships.

19 Claims, 11 Drawing Sheets

1002 Manage, by a processor, a plurality of user accounts, including a first user account associated with a first user and a first user device and a second user account associated with a second user and a second user device, the first user account being associated with an alliance network comprising the second user account as an alliance network member of the first user account, the second user account sharing relationship information with the first user account through one or more alliances, each alliance comprising two user accounts as allies of each other, each of the two user accounts offering a set of digital communications indicating relationships that can be shared with the other user account in the alliance 1004 Monitor, within a time period, a target strength associated with the first user account and an entity based on the set of digital communications offered by the first user account for exploration of relationships in one or more alliances 1006 Transmit to the first user device a notification of a result of the monitoring, to the first user device a recommendation for improving the target strength based on the result of the monitoring, or to a specific user account of the plurality of user accounts a request for contributing to improving the target strength based on the result of the monitoring

(58) Field of Classification Search
CPC .... G06K 9/00677; G06Q 50/01; G06Q 10/10; H04W 4/02; H04W 4/029; H04W 4/08; H04M 1/7243; H04M 1/72451; H04M 1/72457

See application file for complete search history.

(56) References Cited

U.S. PATENT DOCUMENTS

| | | | |
|---|---|---|---|
| 8,539,086 B2 | 9/2013 | Mallet | |
| 8,880,600 B2 | 11/2014 | Lento | |
| 8,880,609 B2 | 11/2014 | Mallet | |
| 8,930,459 B2 | 1/2015 | Mallet | |
| 8,935,332 B2 | 1/2015 | Mallet | |
| 8,954,506 B2 | 2/2015 | Mallet | |
| 8,959,153 B2 | 2/2015 | Mallet | |
| 8,972,501 B2 | 3/2015 | Mallet | |
| 8,984,076 B1* | 3/2015 | Goldman | G06F 16/951 709/206 |
| 9,665,584 B2 | 5/2017 | Jayaram | |
| 9,858,348 B1 | 1/2018 | Higgins | |
| 10,171,985 B1* | 1/2019 | Czajka, II | G06Q 50/01 |
| 2008/0070593 A1 | 3/2008 | Altman | |
| 2011/0167115 A1* | 7/2011 | Gilbert | G06Q 10/00 709/204 |
| 2011/0173316 A1* | 7/2011 | Moromisato | G06Q 10/10 709/224 |
| 2012/0215771 A1* | 8/2012 | Steiner | G06F 16/54 707/723 |
| 2012/0323909 A1* | 12/2012 | Behforooz | G06F 16/24578 707/728 |
| 2013/0297652 A1 | 11/2013 | Higgins | |
| 2014/0222815 A1* | 8/2014 | Roth | G06F 16/9535 707/736 |
| 2014/0297631 A1 | 10/2014 | Jayaram | |
| 2014/0297748 A1 | 10/2014 | Mauney | |
| 2014/0297749 A1 | 10/2014 | Jayaram | |
| 2014/0298204 A1 | 10/2014 | Jayaram | |
| 2015/0188851 A1* | 7/2015 | Tomkins | H04L 51/00 709/206 |
| 2015/0205785 A1* | 7/2015 | Beckwith | G06F 16/313 707/738 |
| 2016/0019661 A1* | 1/2016 | Bouganim | G06Q 50/01 705/319 |
| 2016/0036661 A1* | 2/2016 | Sachdev | H04L 51/32 709/204 |
| 2017/0034176 A1* | 2/2017 | Qi | H04L 29/08 |
| 2019/0327277 A1 | 10/2019 | Zhou | |

OTHER PUBLICATIONS

Martin Shervington, "How to Build Powerful Alliances on Google+", Oct. 14, 2014, Retrieved online on Jan. 28, 2021 from URL https://www.socialmediaexaminer.com/build-powerful-alliances-google-plus/. (Year: 2014).*

Sujan Patel, "Build Strategic Alliances To Amplify Your Content Reach", Jan. 9, 2016, Retrieved online on Jan. 28, 2021 from URL https://marketinginsidergroup.com/content-marketing/strategic-alliances-content-reach/. (Year: 2016).*

Greg Miller, "How to Build a Peer Network to Increase Your Social Reach", Mar. 31, 2016, Retrieved online on Jan. 28, 2021 from URL www.socialmediaexaminer.com/how-to-build-a-peer-network-to-increase-your-social-reach/. (Year: 2016).*

Lavie et al., Exploration and Exploitation Within and Across Organizations, The Academy of Management Annals, vol. 4, No. 1, 2010, 109-155, DOI: 10.1080/19416521003691287, http://www.informaworld.com (Year: 2010).*

Zhou, U.S. Appl. No. 15/959,145, filed Apr. 20, 2018, Notice of Allowance, dated Dec. 4, 2018.

Zhou, U.S. Appl. No. 15/959,145, filed Apr. 20, 2018, Restriction Requirement, dated Jul. 16, 2018.

Zhou, U.S. Appl. No. 15/959,145, filed Apr. 20, 2018, Office Action, dated Sep. 6, 2018.

Zhou, U.S. Appl. No. 15/959,145, filed Apr. 20, 2018, Interview Summary, dated Nov. 8, 2018.

Zhou, U.S. Appl. No. 16/799,310, filed Feb. 24, 2020, Notice of Allowance, dated Sep. 16, 2020.

Zhou, U.S. Appl. No. 16/799,310, filed Feb. 24, 2020, Notice of Allowability, dated Nov. 12, 2020.

Zhou U.S. Appl. No. 16/799,310, filed on Feb. 24, 2020, Interview Summary, dated Sep. 16, 2020.

Zhou, U.S. Appl. No. 16/285,988, filed Feb. 26, 2019, Notice of Allowance, dated Jan. 10, 2020.

* cited by examiner

FIG. 10

1002 Manage, by a processor, a plurality of user accounts, including a first user account associated with a first user and a first user device and a second user account associated with a second user and a second user device, the first user account being associated with an alliance network comprising the second user account as an alliance network member of the first user account, the second user account sharing relationship information with the first user account through one or more alliances, each alliance comprising two user accounts as allies of each other, each of the two user accounts offering a set of digital communications indicating relationships that can be shared with the other user account in the alliance 1004 Monitor, within a time period, a target strength associated with the first user account and an entity based on the set of digital communications offered by the first user account for exploration of relationships in one or more alliances 1006 Transmit to the first user device a notification of a result of the monitoring, to the first user device a recommendation for improving the target strength based on the result of the monitoring, or to a specific user account of the plurality of user accounts a request for contributing to improving the target strength based on the result of the monitoring

MANAGING CONNECTION STRENGTHS USING ALLIANCE DATA

FIELD OF THE DISCLOSURE

One technical field of the present disclosure is digital communication processing. Another technical field is computer-implemented analysis of digital communications including automatic filtering, transformation, and display of messages and electronic documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The Internet has made it easy to connect with others electronically but also challenging to manage such connections. Existing social network systems and professional network systems typically create and store digital records of friends or connections based upon a binary sense of linkage: a first user account is either a friend or connection of a second user account, or not. There are limited ways to account for the type of relationship and limited ways to filter the display of messages, electronic documents or other content based upon the type or strength of relationship. Furthermore, computer-implemented tools for supporting decisions based on type or strength of relationship are either too complex, being directed to intelligence analysis and the like, or inappropriate for business communication management. It would be helpful to have computer support to identify whom to contact for specific purposes and how to establish such a contact more efficiently and effectively.

BRIEF DESCRIPTION OF THE DRAWINGS

In the drawings:

FIG. 10 illustrates an example process of managing connections based on digital alliance data performed by the communication management server computer.

DETAILED DESCRIPTION

Figure 1:
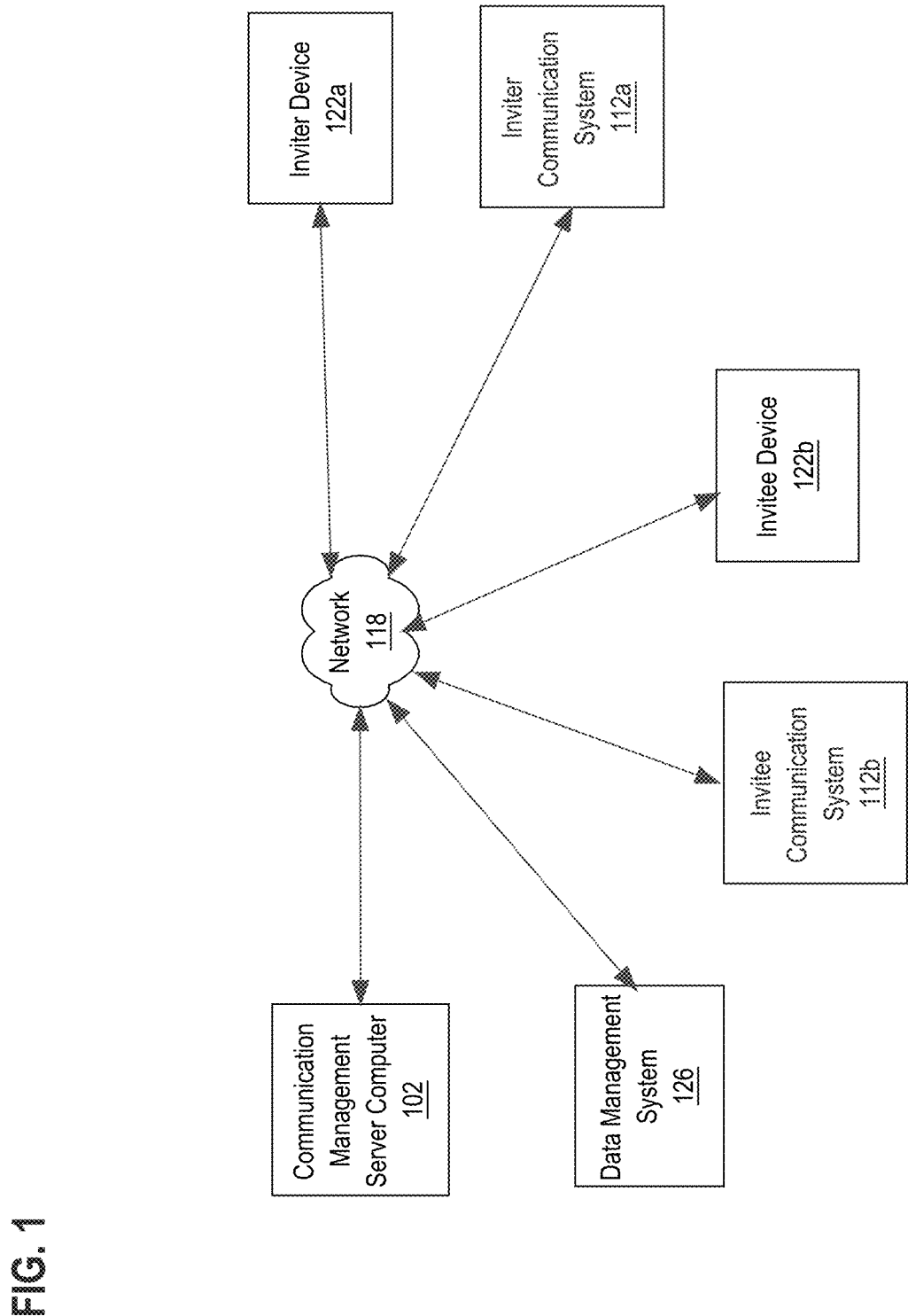
FIG. 1 illustrates an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:

1. GENERAL OVERVIEW
2. EXAMPLE COMPUTING ENVIRONMENT
3. EXAMPLE COMPUTER COMPONENTS
4. FUNCTIONAL DESCRIPTION
   4.1. DEVELOPING ALLIANCES
   4.2. UTILIZING ALLIANCES
   4.3. MANAGING RELATIONSHIP STRENGTHS OR ALLIANCE STRENGTHS
      4.3.1. MONITORING RELATIONSHIP STRENGTHS OR ALLIANCE STRENGTHS
      4.3.2. IMPROVING RELATIONSHIP STRENGTHS OR ALLIANCE STRENGTHS
5. EXAMPLE PROCESSES
6. HARDWARE IMPLEMENTATION

1. General Overview

A communication management server computer ("server") and related methods are disclosed to create and store digital records representing alliances between user accounts and to use the alliance records in filtering messages or other content and/or determining attributes of messages or content for display. The server allows two electronic devices associated with two user accounts to establish an alliance, where each of the two user accounts offers a set of digital communications for exploration of relationships and agrees to share certain types of information regarding the relationships with the other user account. Each user account can be associated with one or more electronic devices. The user account and each associated electronic device may be referenced interchangeably hereinafter. Two user accounts in an alliance are allies of each other and share relationship information with each other through the alliance. A second user account sharing relationship information with the first user account through one or more alliances is denoted and processed as a member of the alliance network (alliance network member) of the first user account. An individual that is not a user but is involved in a digital communication offered by the first user account for use in the alliance network of the first user account is denoted and processed as a contact of the alliance network (alliance network contact).

For example, user accounts associated with individuals A and B are established in digital records in the system; A works for a marketing company and B works for a customer services company. A knows B and communicates with B through email. Now A hopes to expand A's network via B's connections. A is represented by A's electronic device or user account, and B is represented by B's electronic device or user account. In some embodiments, A's electronic device can be programmed to transmit a request to the server to invite B's electronic device to form an alliance. The request indicates what A offers in forming the alliance, specifically a set of digital communications between A and other individuals. For example, A might offer the messages within the email account A uses to communicate with B, where the parties ("contacts") involved in those messages, such as senders or receivers of those messages, include C and D. The request can also indicate what A is willing to share with B. For example, A might decide to share with B only the name, an email address, and a strength of a relationship between each of A's contacts and A (relationship strength associated with A and the contact) revealed by A's email messages. In addition, the request can indicate what A requests B to offer in forming the alliance, such as the messages within the email account B uses to communicate with A. The request can also indicate what A would like B to share with A, such as the name, an email address, and a relationship strength that is associated with each of B's contacts revealed by B's email messages. The server is programmed or configured to transmit, in response, an invitation based on the request to form an alliance to B's electronic device. B can accept or reject the invitation. To accept the invitation, B's electronic device can be programmed to transmit a response to the server. The server is programmed to create and store digital records representing an alliance between A's device and B's device and by association between A and B, who become allies of each other. Allies can be in symmetric positions exploring each other's relationships in similar manners regardless which ally was the inviter or which ally was the invitee. Thus, at least after an alliance is formed, any operation performed by an inviter device can be performed by an invitee device, and vice versa.

In other embodiments, A's request may not indicate what A expects from B, and B's response can indicate what B would offer or be willing to share with A upon forming an alliance. A's electronic device and B's electronic device can continue to negotiate through the server until an agreement is made.

In some embodiments, upon forming an alliance, the server is programmed or configured to determine A's relationships with A's contacts from the set of digital communications offered by A and determine B's relationships with B's contacts from the set of digital communications offered by B. The determination may be based upon metadata representing past computer-based interactions or digital communications between the user accounts. For example, the analysis of B's email messages might reveal E to be one of B's main contacts. The server can be programmed to further determine, based on B's email messages or external data sources, that E works as a manager for a technology company. Subsequently, A might need to find prospects who are managers at technology companies. A's electronic device can submit a query for information regarding such prospects to the server. According to the alliance, the server is then programmed to return the types of information regarding E that is sharable with A, such as the name, an email address, and a relationship strength associated with E, in response to the query. In addition, the server can be configured to facilitate an introduction of A by B to E, thereby expanding A's network via B's connections.

In some embodiments, the server is programmed or configured to monitor a target strength associated with a user account and an entity. The target strength can be an alliance strength of an alliance as an advanced relationship, with the entity being an ally of the user account, or a relationship strength of a (basic, contact-based) relationship, with the entity being a contact of the user account. The server is programmed to further take a remedial measure when the monitored target strength deteriorates significantly. The server is programmed to determine the remedial measure based on the alliance data, including the set of digital communications shared by the user account or another user account for exploration of relationships. The remedial measure can lead to actions taken by a specific user account that is connected to the user account and the entity through one or more alliances or relationships.

In some embodiments, the monitoring of the target strength or the determination of the remedial measure is triggered or otherwise regulated according to certain rules predefined by the server or preferences specified by the user account. For example, the user account can be allowed to specify which target strengths to monitor, whether/when to receive notifications of any change in a target strength, or what types of assistance to receive for improving a target strength.

In some embodiments, the server is programmed or configured to identify the specific user account for contributing to improving a target strength associated with the user account and communicate with the specific user account in accordance with any preferences specified by the specific user account.

In some embodiments, the server is programmed or configured to take different steps depending on whether the entity is an ally or a contact of the user account or whether the specific account is an ally or a contact of the user account or of the entity. The server can also be programmed to take different steps depending on how many specific accounts are selected for contributing to improving a target strength.

The communication management server computer offers many technical benefits. By using alliance data records as a basis of filtering messages that are transmitted between user accounts, for example, the server reduces the number of digital transmissions among electronic devices and thus reduces network traffic at multiple levels. Initially, fewer alliances are formed than simple links or connections, as formation of an alliance requires offering certain digital communications for relationship exploration, discovery, and development, when those digital messages are otherwise maintained in private communication accounts. Therefore, the volume of invitations and responses associated with alliances is smaller than those associated with simple links or connections. Furthermore, fewer substantive communications are made to reach the contacts of allies because the digital communications offered by the allies enable careful evaluation of significance scores of matching interests and relationship strengths and direction of communication efforts to new relationships that are more likely to be created and remain relevant. The server's ability to focus on such new relationships also increases the quality of digital communications and saves users' time. By tapping into available resources, namely automatically analyzing users' past digital communications, the server allows a user to quickly expand the user's network and accomplish project goals while bolstering existing relationships without much extra work.

2. Example Computing Environment

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises a communication management server computer 102 ("server"), one or more inviter devices 122a, one or more inviter communication systems 112a, one or more invitee devices 122b, one or more invitee communication systems 112b, and one or more data management systems 126, which are communicatively coupled directly or indirectly via one or more networks 118.

In some embodiments, the server 102 broadly represents one or more computers, virtual computing instances, and/or instances of a server-based application that is programmed or configured with data structures and/or database records that are arranged to host or execute functions including but not limited to managing alliances each formed by two electronic devices respectively associated with two user accounts and digital communications of the two user accounts associated with the alliance. "Alliance" in this context refers to digital data stored in records in a database or other data repository that indicate or represent a relationship between a first user account and a second user account, where the existence of such a relationship drives execution of data filtering and transmission operations according to constraints, as further described herein. The server 102 can comprise a server farm, a cloud computing platform, a parallel computer, or any other computing facility with sufficient computing power in data processing, data storage, and network communication for the above-described functions.

In some embodiments, an inviter device 122a associated with an inviter is programmed to extend an invitation to an invitee device 122b associated with an invitee to form an alliance and, after an alliance is formed, explore relationships of the invitee based on certain digital communications of the invitee originally managed by the invitee communication system 112b. The inviter device 122a may comprise a desktop computer, laptop computer, tablet computer, smartphone, wearable device, or any other type of computing device with sufficient computing power in data processing, data storage, and network communication.

In some embodiments, the inviter communication system 112a is programmed to manage one or more communication accounts of the inviter holding digital communications of the inviter, such as email messages, calendar entries, phone call histories, or chat messages. Typically, such a communication account is associated with certain credentials that are required for access to the communication account and the digital communications therein. In certain embodiments, the inviter communication system 112a may be integrated with the inviter device 122a.

In some embodiments, an invitee device 122b is programmed to receive the invitation from the inviter device 112a, accept or reject the invitation, and, after the alliance is formed, explore relationships of the inviter based on certain digital communications of the inviter originally managed by the inviter communication system 112a. The invitee device 122b is otherwise similar to the inviter device 122a.

In some embodiments, the invitee communication system 112b is programmed to manage one or more communication accounts of the invitee holding digital communications of the invitee, such as email messages, calendar entries, phone call histories, or chat messages. Typically, such a communication account is associated with certain credentials that are required for access of the account and the digital communications therein. In certain embodiments, the invitee communication system 112b may be integrated with the invitee device 122b.

In some embodiments, a data management system 126 is programmed to manage one or more data sources, such as data regarding people, corporations, or other types of entities.

The networks 118 may be implemented by any medium or mechanism that provides for the exchange of data between the various elements of FIG. 1. Examples of network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the inviter device 122a is configured to send a request to the server 102 for inviting the invitee device 122b to form an alliance. The request contains information necessary to access a communication account of the inviter managed by the inviter communication system 112a, the portion of the digital communications from which relationships of the inviter can be identified for the invitee, and the types of information regarding these relationships that can be shared with the invitee. The server 102 is programmed to send an invitation based on the request to the invitee device 122b. The invitee device 122b is configured to reject or accept the invitation. To accept the invitation, the invitee device 122b is configured to send a response to the server 102. The response similarly contains information necessary to access a communication account of the invitee managed by the invitee communication system 112b, the portion of the digital communications from which relationships of the invitee can be identified for the inviter, and the types of information regarding these relationships that can be shared with the inviter.

In some embodiments, the server 102 is programmed to establish an alliance between the inviter device 122a and the invitee device 122b based on the request from the inviter device 122a and the response from the invitee device 122b. The server 102 is programmed to further access the communication accounts of the inviter and the invitee to retrieve digital communications of the inviter and invitee and identify relationships from the portions of the digital communications of the inviter and the invitee according to the alliance. In addition, the server 102 is programmed to access the data sources managed by the data management system 126 to retrieve data regarding different types of entities that may be involved in the relationships.

In some embodiments, the inviter device 122a (or the invitee device 122b) is configured to send a query for information related to certain prospects. The server 102 is programmed to respond to the query by searching the data regarding the relationships identified from the portion of the communications of the invitee (or the inviter) according to the alliance and additional data regarding the entities involved in the relationships and return the search result to the inviter device 122a (or the invitee device 122b). The search can be extended to data regarding the relationships identified from appropriate portions of the communications of the user accounts in the alliance network of the invitee (or the inviter) account, as further discussed below.

3. Example Computer Components

Figure 2:
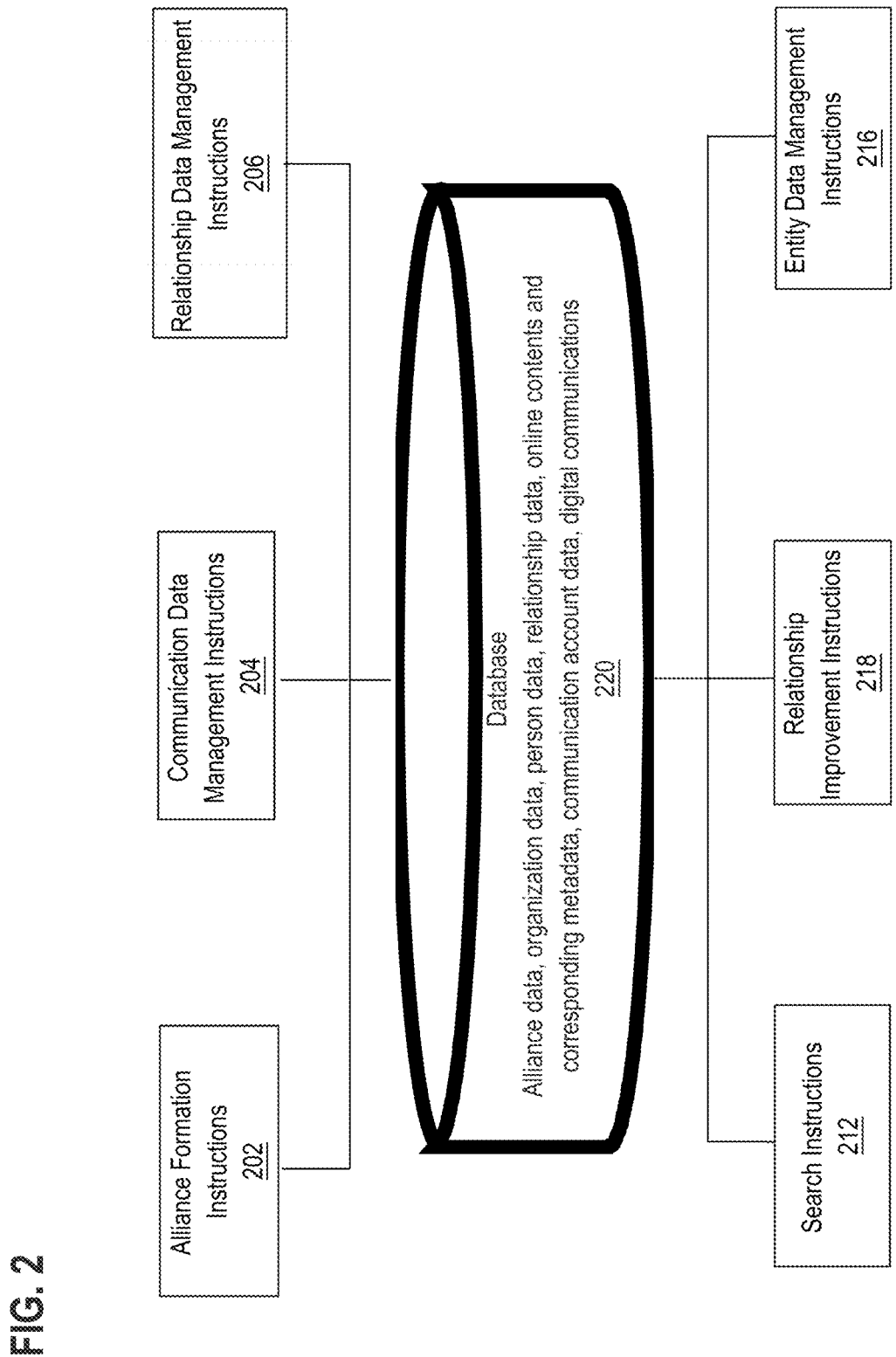
FIG. 2 illustrates example components of a communication management server computer in accordance with the disclosed embodiments.

FIG. 2 illustrates example components of the communication management server computer in accordance with the disclosed embodiments. This figure is for illustration purposes only and the server 102 can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 can comprise alliance formation instructions 202, communication data management instructions 204, relationship data management instructions 206, search instructions 212, entity data management instructions 216, and relationship improvement instructions 218. In addition, the server 102 can comprise a database module 220.

In some embodiments, the alliance formation instructions 202 enable managing the formation of an alliance between an inviter device 122a and an invitee device 122b, such as communicating with such devices in forming the alliance.

In some embodiments, the communication data management instructions 204 enable managing digital communications of the inviter and the invitee. Such management may include communicating with the inviter communication system 112a and the invitee communication system 112b to retrieve digital communications of the inviter and the invitee and managing copies or views of these digital communications in local databases.

In some embodiments, the relationship data management instructions 206 enable managing relationship data derived from the digital communications of the inviter and invitee or more broadly the digital communications offered by each user account for exploration of relationships. Such management may include identifying relationships from the digital communications and controlling which types of information regarding the relationships are made accessible to a specific user device.

In some embodiments, the search instructions 212 enable managing the search process in response to a query directly submitted by a user device or based on relevant data extracting from online contents received by a user device. Such management may include communicating with the user device and searching the relationship data in local databases for matches to the query. Such management may further include collecting information regarding at least one communication path that connects the user to the new contact through an alliance network member of the user's account and communicating with a device of the user or a device of the alliance network member.

In some embodiments, the entity data management instructions 216 enable managing data regarding different types of entities, such as a person or an individual, a company or a corporate entity, or an organization of any purpose, or other data relevant for relationship exploration and formation. Such management may include communicating with the data management system 126 and supplementing the relationship data with entity data or other data retrieved from external data sources.

In some embodiments, the relationship improvement instructions 218 enable monitoring and increasing a target strength, namely an alliance strength between a user account and an ally or a relationship strength between a user account and a contact. Such monitoring and increasing can include detecting whether the change in the target strength over a specific period time indicates any significant deterioration and, in response to detecting a significant deterioration, determining which actions to take to improve the target strength.

In some embodiments, the database 220 is programmed or configured to manage relevant data structures and store relevant data for functions performed by the server 102. The data may correspond to alliances, persons or individuals, companies or other corporate entities, other organizations, relationships, websites, webpages, other online data, communication accounts, or digital communications. For an organization, which can correspond to a corporate entity, a department within a corporate entity, a high school class, a choir, or a wine club, values of various attributes may also be stored, such as name, location, size, or industry. For an individual, values of various attributes may be stored, such as name, communication mechanisms, credentials for communication accounts, names of organizations to which the individual belongs, or names of employers. For an alliance or a relationship, various types of information can be stored, such as a history of alliance strength or relationship strength or common interests associated with the alliance or relationship.

4. Functional Description 4.1. Developing Alliances

In some embodiments, the server 102 is programmed or configured with data structures and/or database records that are arranged to receive a request for forming an alliance from an inviter device 122a associated with an inviter. The inviter could be an administrator of the server 102 or a regular user. The request identifies the inviter or the inviter device. The request also identifies an invitee, which can include a name or the ID of a communication account, such as an email address, a phone number, or a chat program user ID.

In some embodiments, the request can include information regarding access to one or more of the inviter's communication accounts, such as an account for email, event scheduling, or chat. The request can indicate a selection criterion to be applied to the digital communications in the one or more communication accounts, indicating a set of the inviter's digital communications to be associated with the alliance. The selection criterion can refer to any field of a digital communication. For example, the selection criterion can be all the email messages in the folder named "Construction Project", all the email messages of which a specific user did not receive a copy, or all the calendar entries for events that took place during March. The request can also provide a specification of the types of information regarding relationships identified from the set of the inviter's digital communications that are to be shared with the invitee device 122b. Default types of information can include names of individuals or contacts in the relationships and the corresponding relationship strengths. Additional types of information can include, for each of those contacts, a summary of digital communications with the contact in terms of communication mechanism, frequency, nature, etc. The credentials for the one or more communication accounts, the selection criterion, or the specification of the types of information regarding the relationships to be shared can also be transmitted to the server 102 after a response is received from the invitee device 122b.

Moreover, the request can provide information regarding expanding the alliance. For example, default relationship sharing can be that only two parties that form an alliance can explore the other's relationships based on the digital communications offered by the other for relationship exploration and discovery. The default can then be expanded via a transitive relationship. For further example, A and B forms an alliance, so that information regarding A's relationships based on A's email is shared with B and information regarding B's relationships based on B's calendar entries is shared with A. Subsequently, A and C forms a separate alliance, where information regarding A's relationships based on A's chats is shared with C and information regarding C's relationships based on C's email is shared with A. The default can be that nothing is shared between B and C before they form their own alliance. The default can then be expanded by one degree of alliance, so that through A, information regarding B's relationships based on B's calendar entries is shared with C and information regarding C's relationships based on C's email is shared with B. B or A can also specify that while information regarding B's relationships based on all of B's calendar entries is shared with A, only information regarding B's relationships based on some of B's calendar entries is shared with an individual who is not B's ally. The individuals that share relationship information through one or more alliances or their user accounts are then in an alliance network. In the example above, B could be the inviter, and A could be the invitee. When a maximum degree for B's alliance network is two (one or more than default), C is allowed to share B's relationship information through A. Thus, request from the inviter device 122a can also indicate a maximum degree (with one being the default) for the inviter's alliance network or a selection criterion for each additional degree. This request can also be transmitted to the invitee device 122b after a response is received from the invitee device 122b.

Furthermore, the request can include additional privacy settings or constraints applicable to the alliance to be formed. Similar privacy settings or constraints can also be specified at the user account level applicable to all alliances formed by the inviter or associated user account. Such privacy constraints can limit the use of the alliance to be formed to varying degrees. For example, a privacy constraint can allow exploration of relationships within the inviter's communication accounts associated with this alliance only by the invitee account and other user accounts associated with specific industries or certain business positions. For further example, another privacy constraint can hide the identity of the inviter when one of the relationships that can be derived from the inviter's communication accounts is included in a search result for a search query made by a user account in the alliance network of the inviter account other than the invitee account. Another privacy constraint can specify which relationships with contacts are explorable by user accounts in the alliance network in terms of various attributes of a contact, such as an ID, name, or domain of the contact's email address.

In some embodiments, upon receiving the request, the server 102 is programmed to look up the inviter in the database 220, including identifying an organization to which the inviter belongs, as further discussed below. The server 102 can be programmed to also look up the invitee in the database 220 and when data regarding the invitee is found, identify an organization to which the invitee belongs. Then, the server 102 is programmed to prepare an invitation based on the request and have the invitation transmitted to an invitee device 122b. The invitation includes information regarding the inviter, such as the name, the organization identified for the inviter, or an email address. The invitation also indicates an intention to form an alliance with the invitee by offering each other's digital communications for relationship exploration and discovery. In addition, the invitation can include a summary of the digital communications offered by the inviter for relationships exploration and discovery. For example, the summary can be a description of the selection criterion provided by the inviter device 122a. The invitation can also include one or more other types of information included in the request.

Furthermore, the invitation includes a request to provide access to one or more of the invitee's communication accounts. The invitation can further include a request to provide a selection criterion to be applied to the digital communications in the one or more communication accounts, indicating the set of the invitee's digital communications to be associated with the alliance. In addition, the invitation can include a request to provide a specification of the types of information regarding relationships identified from the set of the invitee's digital communications that are to be shared with the inviter device 122a. The invitation can also include a request for the invitee to join the organization identified for the inviter. Furthermore, the invitation can include a request to indicate a maximum degree for the invitee's alliance network or a selection criterion for each additional degree. One or more of the requests discussed in this paragraph can also be transmitted to the invitee device 122b after a response is received from the invitee device 122b.

In some embodiments, the server 102 is programmed to receive a response to the invitation from the invitee device 122b. The response can include a rejection of the invitation, in which case the server 102 is configured to send a notification of the rejection to the inviter device 122a. Alternatively, the response can include an acceptance of the invitation. In that case, the server 102 is configured to send a notification of the acceptance to the inviter device 122a. The response can also include information that allows the server 102 to access one or more of the invitee's communication accounts. The response can also include a selection criterion to be applied to the digital communications in the one or more communication accounts. In addition, the response can include a specification of types of information regarding relationships identified from the set of the invitee's digital communications that are to be shared with the inviter device 122a. In addition, the response can include an indication of whether to join the organization identified for the inviter, to remain in the organization identified for the invitee, or to form a new organization corresponding to the alliance. Moreover, the response can include a maximum degree for the invitee's alliance network or a selection criterion for each addition degree. Similar to a request, the response can include other types of information, such as privacy settings or constraints specific to the alliance being formed. It is to be understood that the formation of an alliance can be an iterative process, with parts of the requests or response provided to the server 102 in an incremental manner in a negotiation between the inviter device 122a and the invitee device 122b until an agreement is reached. In addition, default values can be used so that not all parts of the request and response discussed above need to be communicated to the server 102.

In some embodiments, upon receiving the response, when the invitee is a new user, the server 102 is programmed to request additional information regarding the invitee and the invitee device 122b, such as a business entity the invitee works for, different contact mechanisms to reach the invitee, and so on. Overall, the server 102 is configured to store all the data received from the inviter device 122*a* and the invitee device 122*b* to the database 220, which constitute at least part of digital alliance data representing the alliance between the inviter and the invitee. The server 102 can also be programmed to transmit certain data in the response that did not correspond to any part of the request to the inviter device 122*a*.

In some embodiments, the server 102 is programmed to receive a request for forming an alliance from an inviter device 122*a* or any other user device that does not identify an invitee. The server 102 can be programmed to post an invitation corresponding to the request at an address accessible to one or more user devices, such that a selection of the address or a view of the posting by an invitee device 122*b* or any other user device generates an acceptance of the invitation or at least triggers a process to respond to the invitation, as described above. The server 102 can be programmed to also broadcast the address to select user devices, or without any posting, directly broadcast the invitation to select user devices. Alternatively, the server 102 can be configured to rely on the sender of the request to communicate the address to other user devices. For example, the address can be in the form of a URL, and the address can be announced by the inviter device 122*a* to every email address in an address book associated with the inviter device 122*a*.

In some embodiments, the server 102 is programmed to receive a request to become a user from a user device, which is then able to extend invites to another user device to form an alliance. The request can also be submitted on behalf of another user device associated with another user. For example, a request can be to sign up all the user devices associated with all the employees of an employer, offering all the employees' email accounts for forming alliances. In response, the server 102 can be configured to assign all those user devices and the associated user accounts to the same organization, which may correspond to the employer's corporate entity. The server 102 can be programmed to further form an alliance between every pair of those user devices, so that each employee has access to the relationships revealed by every other employee's email.

In some embodiments, the server 102 is programmed to access the one or more of the inviter's communication accounts and download the digital communications into the database 220 as soon as the credentials for the one or more communication accounts are received, according to a specific schedule, or in response to a relevant search, such as a search by the invitee. The download can be incremental to a previous download. The server 102 is further programmed to apply each selection criterion provided by the inviter for the alliance to the digital communications in the one or more communication accounts to obtain a set of the inviter's digital communications specific to the inviter or another individual in the invitee's alliance network according to a specific schedule, during the actual download of the digital communications, during the calculation of metadata (e.g., relationship strength) from the downloaded digital communications, or during a search made by the invitee.

In some embodiments, the server 102 is configured to further identify a list of contacts from the set of the inviter's digital communications and corresponding relationship strengths. For example, when the set of the inviter's digital communications is a number of email messages, the senders or recipients of each email message other than the inviter can be identified, and the number of times each of these individuals is a sender or a receiver can be used to compute the corresponding relationship strength. The inviter's digital communications can be augmented with additional data from external data sources in determining the relationship strengths. Examples of the additional data include communication information related to public conferences, events, or social networks. The server 102 is programmed to establish person data for each of the contacts based on the set of digital communications or external data sources. For example, the employer of a contact may be derived from the email address of the contact or specific remarks of the contact in the set of digital communications. Such employment information can also be retrieved from the employer's website or other public data sources. The contact can also be assigned to one of the organizations in a similar manner. Depending on the types of information regarding relationships identified from the set of the inviter's digital communications that are to be shared with the invitee or another individual in the inviter's alliance network, the server 102 can be configured to determine additional types of information concerning the relationships. For example, for each identified contact, the server 102 can be configured to compute the number of digital communications via a specific communication mechanism or within a specific period of time; the server 102 can also be configured to compile a list of headers of these digital communications or a summary of all these digital communications. The server 102 is programmed to further repeat this process with the invitee's digital communications based on the invitee's acceptance.

In some embodiments, the server 102 is programmed to obtain or compute a strength of an alliance between two user accounts, which may depend on the number or types of digital communications offered for exploration by the two user accounts, the number of other user accounts who are common allies of two user accounts, or the number and types of interests of the two user accounts. For example, the alliance strength may be higher when the digital communications came from a private communication account as opposed to a business communication account or were transmitted during the last month as opposed to last year.

4.2. Utilizing Alliances

In some embodiments, the server 102 is programmed to receive a query from a first user device associated with the first user for relationship information associated with a second user who is an ally of the first user. In response, the server 102 is programmed to determine the list of relationships of the second user and specific types of information regarding those relationships according to the alliance with between the first user and the second user. The identification can be performed by real-time computation or based on data already stored in the database 220. For example, when the second user has agreed to share with the first user email and relationship strength information regarding his relationships based on a selection of his calendar entries, the server 102 can be configured to access the second user's calendar entries, obtain the selection of calendar entries, identify the list of contacts from the selection, and retrieve or compute the corresponding list of relationship strengths for those contacts. Alternatively, the selection of calendar entries, the list of contacts, or the list of relationship strengths may already be in the database 220 and simply need to be retrieved. Similarly, the query may be for relationship information associated with a third user who is in the first user's alliance network. The server 102 is programmed to further return the specific types of information regarding a list of relationships of the third user visible to the first user to the first user device.

In some embodiments, the server 102 is programmed to receive a query from a first user device associated with the first user for relationship information associated with allies of the first user concerning a contact. In response, the server 102 is programmed to determine the list of relationships of the allies of the first user with the contact and specific types of information regarding those relationships according to the alliance between the first user and each of the allies. Similarly, the query may be for relationship information associated with members of the alliance network of the first user concerning the contact. The server 102 is programmed to further return the specific types of information regarding a list of relationships of the members to the first user to the first user device.

Figure 3:
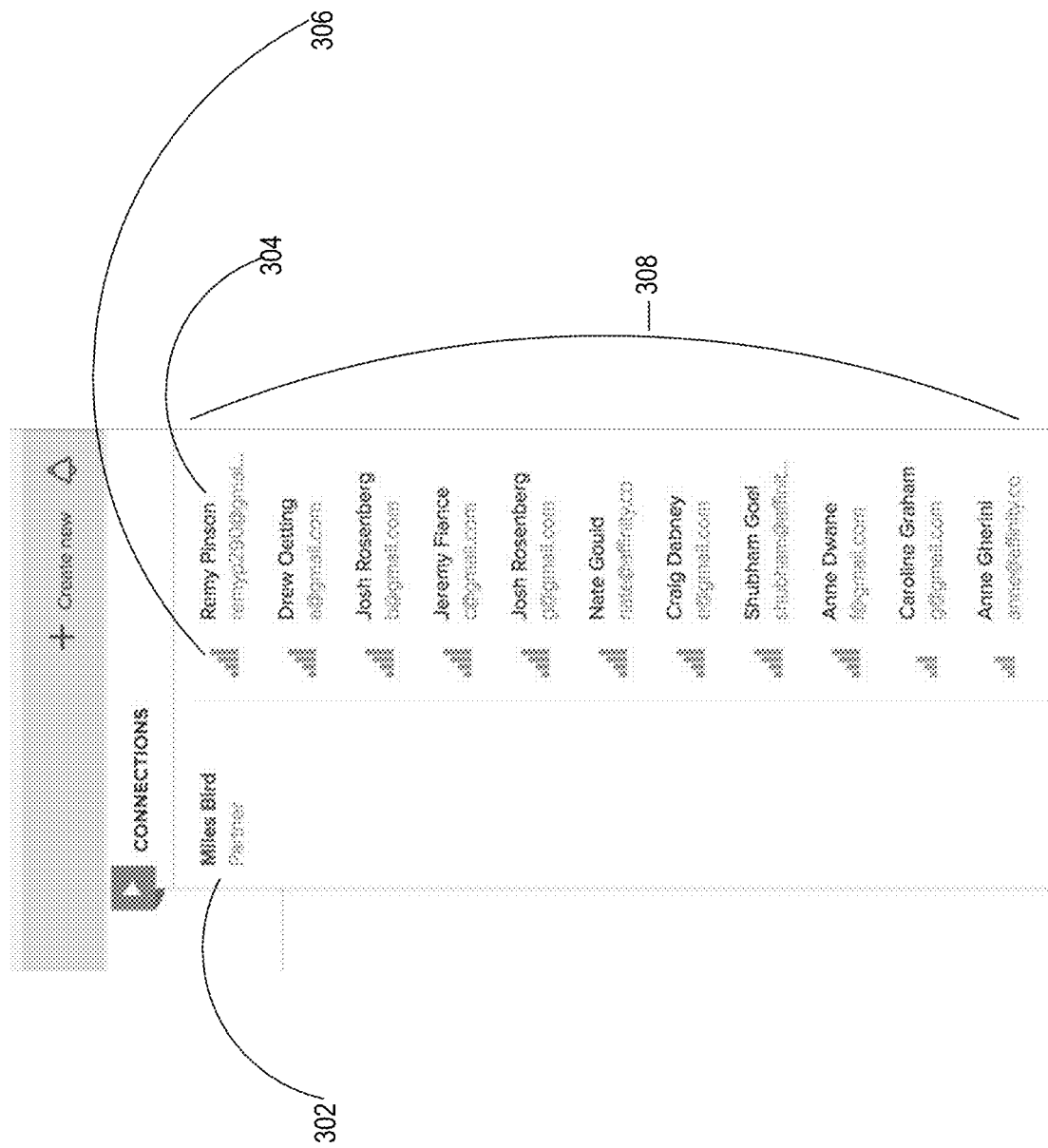
FIG. 3 illustrates an example screen of a graphical user interface that shows information regarding a list of relationships visible to a first user between each of a list of allies of the first user's account and a contact.

FIG. 3 illustrates an example screen of a graphical user interface that shows information regarding a list of relationships visible to a first user between each of a list of allies of the first user's account and a contact. In this example, identifying information 302 regarding the contact is displayed. A list of entries 308 corresponding to the list of relationships each including identifying information regarding an ally of the first user and the corresponding relationship strength is also displayed. Specifically, the first entry of the list includes the name and email address 304 of an ally and a relationship strength indicator 306 in the form of a colored or shaded one through five bars, with more bars indicating a stronger relationship. The relationship strength indicator as shown here is for illustration only and it can have other shapes or forms. For example, it can use numerical values to indicate different relationship strengths.

The query can be expanded to be for relationship information associated with a member of the alliance network of the first user's account concerning the contact. The screen can then include additional information for each of the list of determined relationships, such as the degree or the number of alliances required from the first user to reach the contact. Each entry can also indicate information regarding at least one of these alliances. For example, when the first user's account and a second user's account are in an alliance, the second user's account and the ally with the name and email address 304 are in an alliance, a degree of two and identifying information regarding the second user can also be included in the first entry.

The query can be expanded to be for relationship information associated with a second user in the alliance network of the first user's account. The screen can then include additional information for each of the list of determined relationships, such as the degree or the number of alliances required from the first user to reach an individual involved in the relationship. Each entry can also indicate information regarding the individuals or their associated accounts forming these alliances. For example, when the second user's account and a third user's account are in an alliance and it is the third user that is related to the contact identified by the information 302, a degree of two and identifying information regarding the third user can be included in the first entry.

Figure 4:
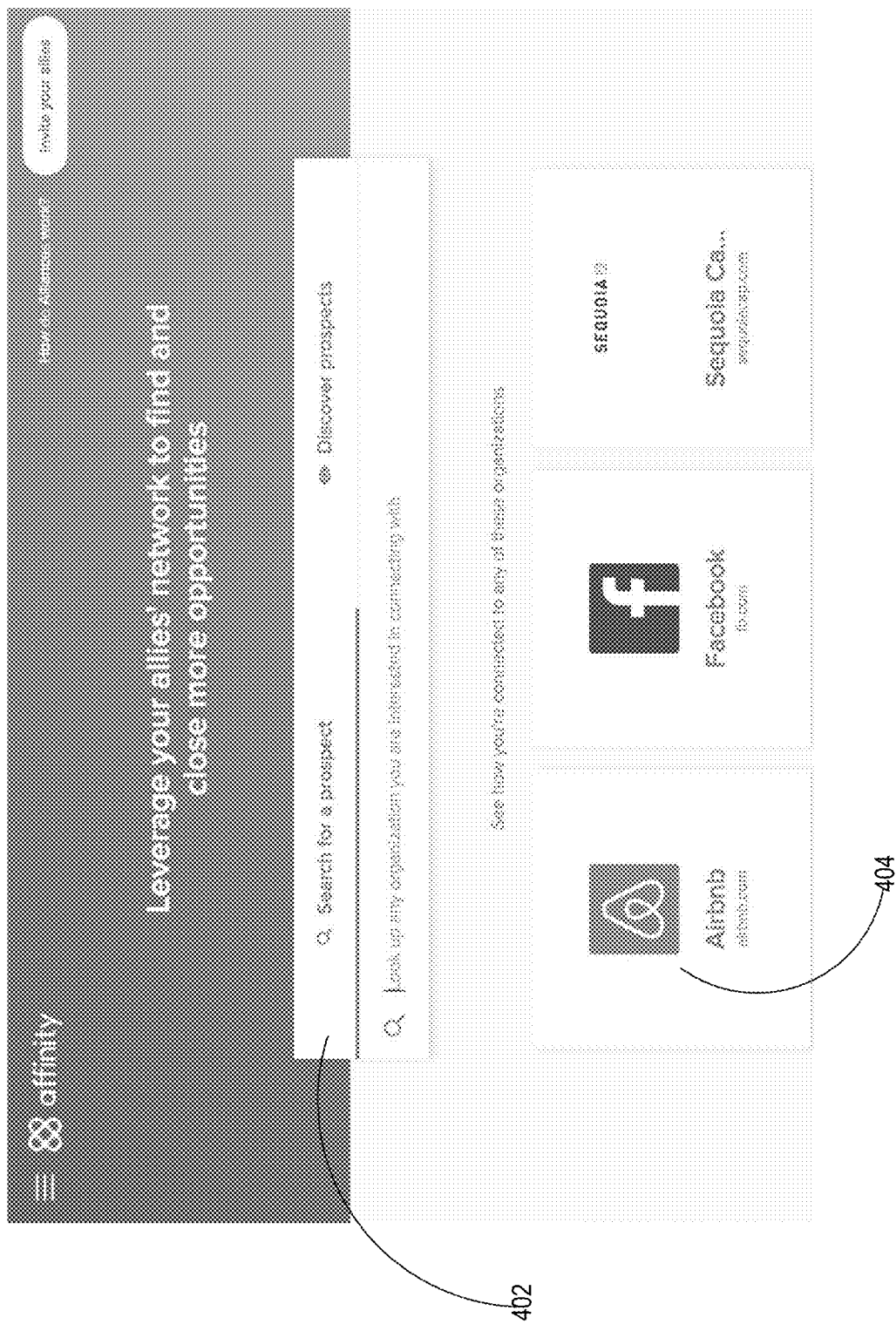
FIG. 4 illustrates an example screen that allows querying for information regarding relationships associated within an organization.

In some embodiments, the server 102 is programmed to receive a query for information regarding relationships within an organization from a first user device associated with a first user. FIG. 4 illustrates an example screen that allows querying for information regarding relationships within an organization. The screen includes a text field 402 for entering a text query, such as the name, address, or other identifying information or attributes of an organization. The screen also includes an icon 404 representing each of specific organizations, the selection of the icon leading to a query corresponding to the corresponding organization. These specific organization can be the most often searched by the first user device or by a specific group of user devices within a specific period of time. These specific organization can also be the most relevant to the first user device or the first user, such as prospective customers or employers for the first user.

In some embodiments, in response to the query, the server 102 is programmed to determine the queried organization. The text query provided by the first user device can be matched to organization data in the database 220 using a pattern matching technique known to someone skilled in the art based on specific rules. For example, an organization may have subsidiaries or subdomains. Such relations can be stored as part of the organization data or encoded in the organization matching rules. The server 102 is programmed to further identify a list of relationships involving individuals who are related to those user accounts who are in the first user's alliances (or alliance network) and who belong to the organization. Specifically, person data concerning those individuals can similarly be matched to organization data based on specific rules. For each of the list of relationships, the server 102 is programmed to also determine the types of information that are visible to the first user or first user device based on the alliance data, similar to the handling of the query for relationship information associated with a second user who is in an alliance with the first user discussed above. In addition, the server 102 is configured to perform some aggregation on the list of relationships. Such aggregation can include calculating a total number of relationships that correspond to the same individual in the queried organization, an average relationship strength over these relationships, or an aggregate of other types of data visible to the first user over these relationships. Furthermore, the server 102 is programmed to transmit to the first user device the types of information accessible to the first user device regarding the list of relationships, including the aggregation data.

In some embodiments, the server 102 can be programmed to facilitate pursuit of the list of relationships determined for the first user device or any other relationship identified by the server 102. For example, a graphical user interface can be used to enable preparation and delivery of an introductory digital communication from the first user device to a device corresponding to one of the list of relationships with a few simple user interactions. Furthermore, the server 102 can be configured to analyze the calendar events or other digital communications of the first user or of an individual corresponding to one of the list of relationships and determine schedules, communication habits, or common interests of the first user or the individual. Based on the determination, the server 102 can be configured to send suggestions to the first user device on how to establish contact with the individual, subject to privacy or other constraints specified by the individual. For example, upon determining that the first user and the individual will be attending the same conference, a recommendation to make an in-person introduction before or during this conference can be transmitted to the first user device. For further example, upon determining that the individual composes a large volume of email but schedules relatively few (such as lower than 10%) telephone, video, or in-person conferences, a recommendation to make an email introduction initially can be transmitted to the first user device.

Figure 5:
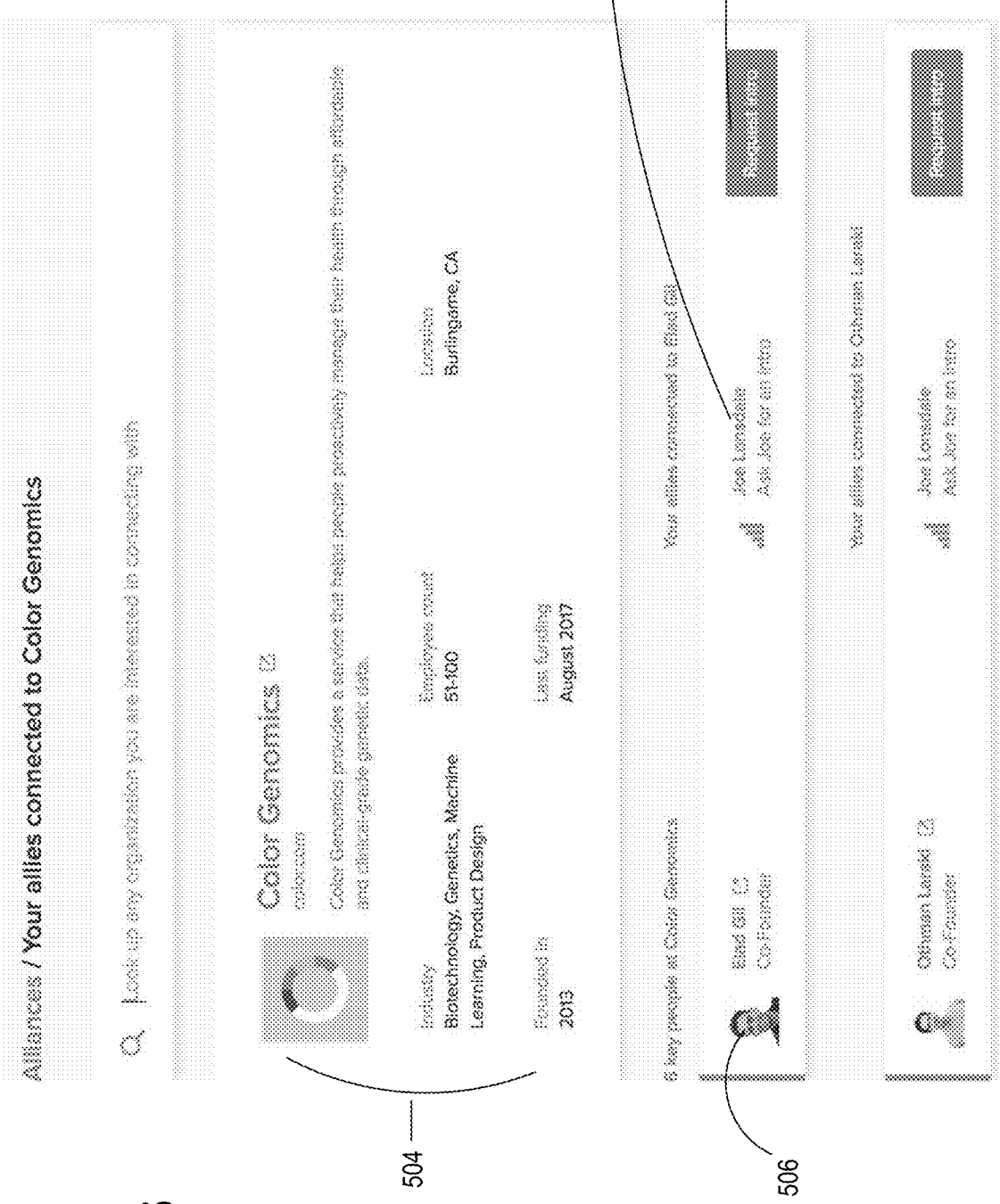
FIG. 5 illustrates an example screen that shows search results in response to a query from a first user device associated with a first user for information regarding relationships associated with an organization.

FIG. 5 illustrates an example screen that shows search results in response to a query from a first user device associated with a first user for information regarding relationships associated with an organization. The screen shows information regarding the queried organization 504, including a name, website, description, industry classification, employee count, location, year of creation, and last time of funding. Additional data regarding the organization stored in the database 220 or less data can be displayed. The screen also shows data regarding a list of relationships involving individuals in the organization who are related to those user accounts who are in the first user's alliances (or alliance network). The screen can also show data regarding one or more allies in the organization. For each of the relationships, the data can include identifying information of the corresponding individual 506, such as a name and an email address, information regarding the relationships that lead to this individual 508, such as names of one or more user accounts who are in the alliance network of the first user's account or communicate with the individual and an indication of an aggregate relationship strength over the one or more user accounts. In addition, the screen can also provide a mechanism 510 that allows the first user to contact the individual through a user associated with one of the allies of the first user's account (or a chain of people associated with the alliance network of the first user). In response to a selection or an activation of this mechanism 510, a default notification can be sent to a device of a corresponding user. Alternatively, another screen corresponding to a new digital communication addressed to that corresponding user can be presented to allow the first user to customize the notification, and the completed digital communication can be delivered to the device of that corresponding user. Alternatively, the screen can show information regarding a communication mechanism to reach the individual directly, as long as such information is visible to the first user to the relevant alliance data.

Figure 6:
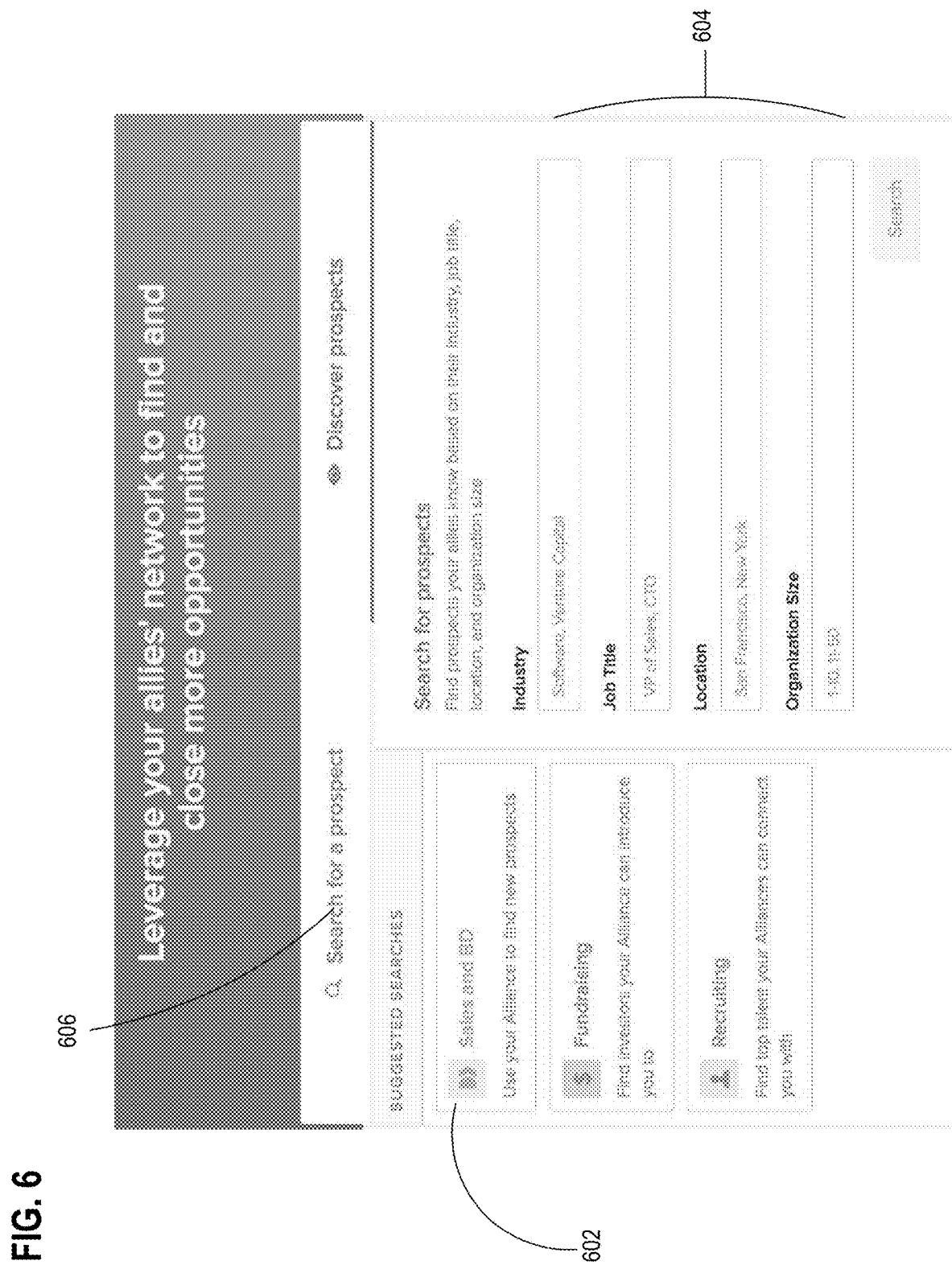
FIG. 6 illustrates an example screen that allows querying for information regarding relationships according to a specific criterion.

In some embodiments, the server 102 is programmed to receive a query for information regarding relationships who satisfy a certain criterion from a first user device. This query is different from a query for information regarding relationships within an organization in that this query is not limited to any organization. Therefore, the relationships found in response to this query can involve individuals who belong to any of multiple organizations or no organization at all. FIG. 6 illustrates an example screen that allows querying for information regarding relationships according to a specific criterion. The screen offers multiple ways to specify the criterion. A user can enter free-form text in the text field 606, such as the title of the position within an organization or the number of years with an organization. The screen also allows the selection of one of the buttons 602 which represent specific industries to which an organization of a prospect may belong, such as fundraising or recruiting, or which represent other specific combinations of attribute values. In addition, the screen allows the input of values into text fields 604 for specific attributes of an organization of a prospect, such as the location or size. The screen may also provide suggestions for these values based on what is already input or data from external sources. For example, in response to an input of "software" as an industry, a suggestion of "hardware" can be presented as a suggestion because these two industries are often searched together. In addition to or instead of the criterion related to an organization of a prospect, a criterion directly related to an individual, such as the age or number of alliances, can also be submitted and processed.

In some embodiments, in response to the query, the server 102 is programmed to determine the queried individuals through their organizations or directly. The query provided by the first user device can be matched to organization data or person data in the database 220 using a pattern matching technique known to someone skilled in the art based on specific rules, similar to the handling of a query for information related to relationships within an organization discussed above. The server 102 is programmed to ultimately identify a list of relationships involving individuals who are related to those user accounts who are in the first user's alliances (or alliance network) and who satisfy the certain criterion, determine the types of information that are accessible to the first user device based on the alliance data for each of the list of individuals, and perform some aggregation on the list of relationships, also similar to the handling of a query for information related to relationships within an organization discussed above.

Figure 7:
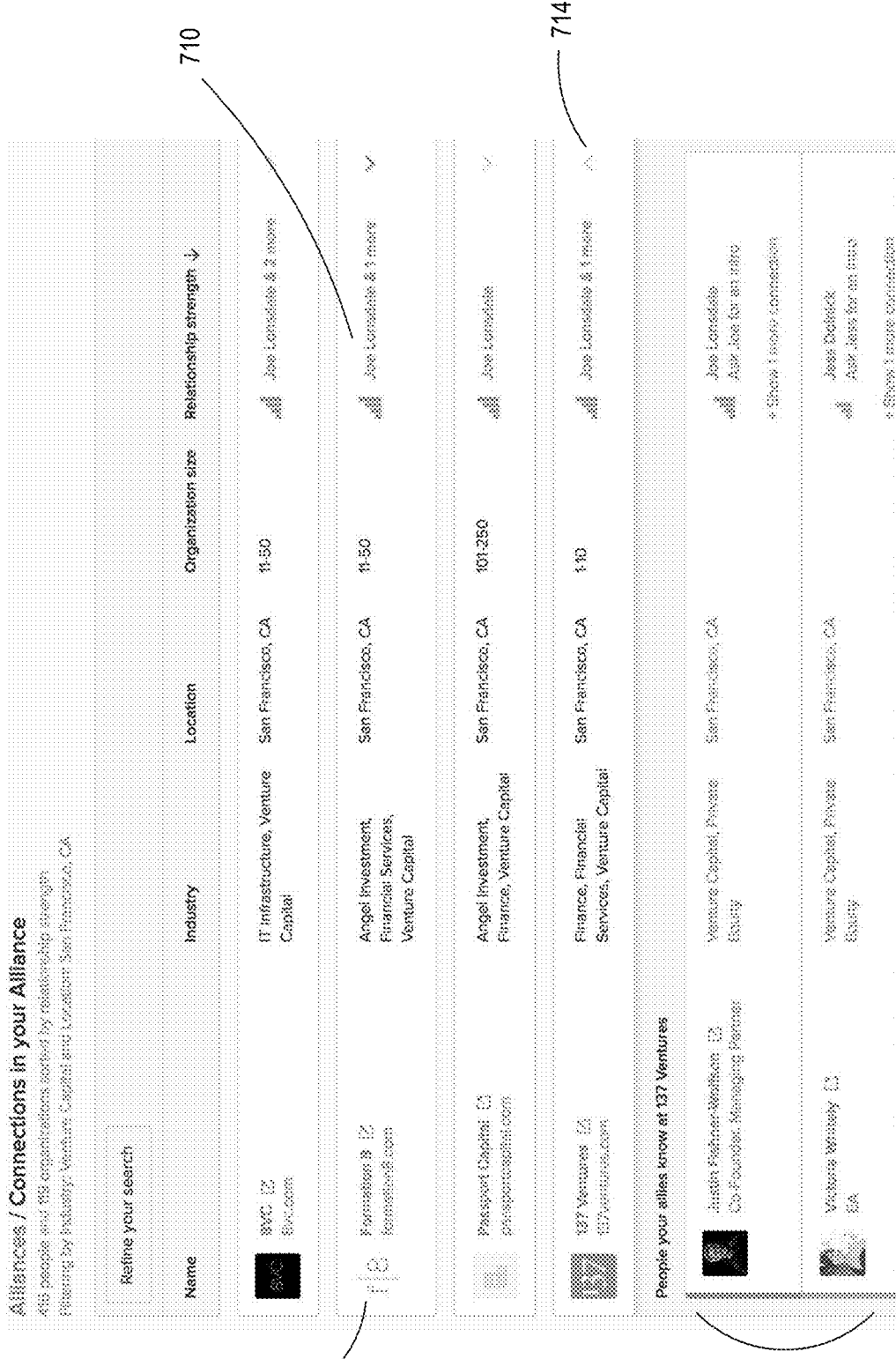
FIG. 7 illustrates an example screen that shows search results in response to a query for information regarding relationships according to a specific criterion.

FIG. 7 illustrates an example screen that shows search results in response to a query for information regarding relationships according to a specific criterion. The screen shows information that is accessible to the first user according to the alliance data regarding each organization that satisfies the query or each organization of an individual that satisfies the query. The information can include identifying information 702, such as the name, a website, or a location, or include values of the attributes that are part of the query. For each of these organizations, the screen also shows aggregate relationship information 710, such as the number of relationships within the organization, the names of one or more user accounts who are in the first user's alliances or alliance network and who communicate with the individuals involved in these relationships, or the average relationship strength over these relationships. For example, for example, for the organization corresponding to the business entity Formation 8, Joe Lonsdale and another user are the first user's allies or are in the first user's alliance network and can be relied on to reach an individual who work for Formation 8. More detailed relationship information can also be shown. In this example, individual-level information 706 is shown as an expansion of the organization-level information, indicating information regarding the list of relationships within the organization. The user can choose to see such expanded information through a toggle 714. The screen can additionally show a list of relationships who do not belong to any organization.

In some embodiments, the server 102 is programmed to identify or suggest prospective allies or prospective contacts for a user or user device. Specifically, the server 102 can be configured to analyze the user's search history, the user's own digital communications including a corresponding communication history, the allies' search histories, or the digital communications of the user's allies that are explorable according to the alliances including a corresponding communication history. Based on the analysis, the server 102 can be configured to then identify individuals who satisfy a certain criterion predetermined by the server 102 or provided by user device. Such criteria might apply to the individual, any organization to which the individual belongs, or the relationship with the user or an ally of the user. For example, one criterion may be a contact who is a manager in a technology company who communicated with the user or an ally within the last six months. Another criterion may be an individual who is at a higher position than an existing contact (with whom the user has communicated) and with whom no other employee of the user's employer has had any digital communication. The server 102 can be programmed to further distinguish between prospective allies and prospective contacts based on specific criteria, such as the strength of the relevant relationship with the prospect, the job title of the prospect, etc. The server 102 can be programmed to determine such prospective allies or contacts according to a specific schedule or upon request by the user device and send appropriate information regarding these prospects to the user device.

In some embodiments, the server 102 is programmed to further estimate the impact of forming an alliance and communicate such estimated impact to a user device to assist the user device in deciding how to form additional alliances. The server 102 can be programmed to estimate the impact for each identified prospective ally or contact, as discussed above, or use the estimated impact to improve the identification of prospective allies or contacts. Subject to privacy or other constraints associated with each user account, the server 102 can be configured to compute certain statistics based on the relationships associated a specific user account. The statistics can be related to the relationships that can be derived from digital communications in one of the communication accounts associated with the specific user account or various attributes of these relationships. For example, the statistics can include a total count of relationships that are new to the user device, an average age of the individuals corresponding to the new relationships, or the number of different employers of those individuals. For further example, the user account might give priority to forming an alliance with the specific user account when the user account is associated with an employer in the food industry and when the statistics show that the new relationships that can be explored as a result of the alliance are associated with many employers in the food industry.

Figure 9:
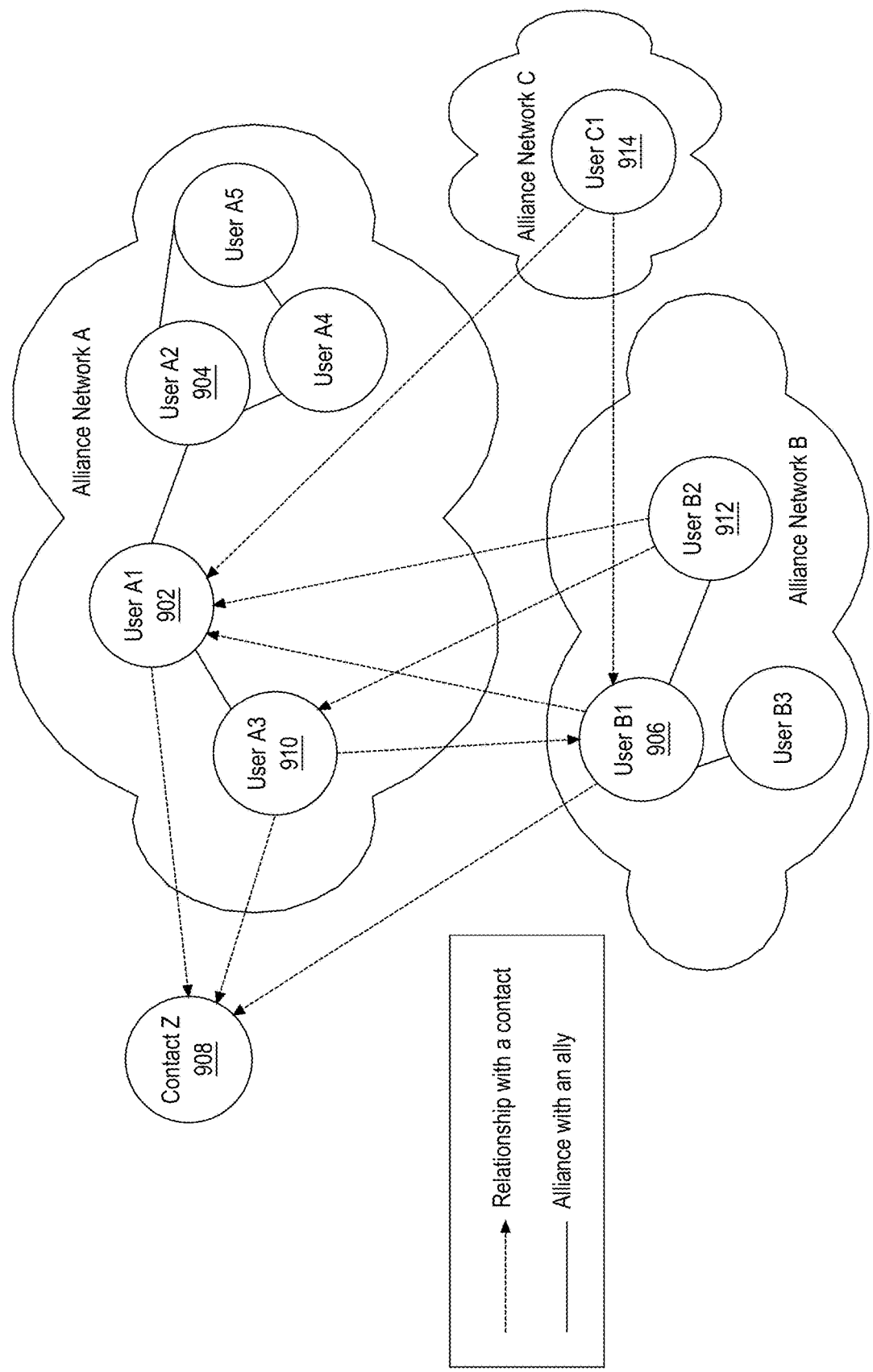
FIG. 9 illustrates an example scenario including one or more alliance networks and contacts.

4.3. Managing Relationship Strengths or Alliance Strengths 4.3.1 Monitoring Relationship Strengths or Alliance Strengths FIG. 9 illustrates an example scenario including one or more alliance networks and contacts. In some embodiments, the server 102 is programmed to monitor the relationship strength of a relationship between a first user account of a first user, such as 902, and a first contact of the first user account involved in a digital communication offered by the first user account for exploration of relationships in one or more alliances. The first contact may be a certain user having a certain user account, such as 906, with the server 102, or an individual, such as 908, not having a user account at all with the server 102. Such a relationship strength can be recalculated periodically, upon a request from the first user account or another user account, or in response to certain events. The certain events can include when the size of the set of digital communications offered by the first user account for exploration of relationships has increased by a specific amount, when the set of digital communications newly includes or excludes digital communications from a specific communication account associated with the first user account or are now associated with a new selection criterion for the specific communication account, or when the relationship strength of a relationship between the first user account and a second contact of the first user account meets certain criteria for improvement, as further discussed below.

In some embodiments, the server 102 is programmed to similarly monitor the alliance strength of an alliance between the first user account and a second user account of a second user, such as 904. Such an alliance strength can be recalculated periodically, upon a request by either of the first user account and the second user account or another user account, or in response to certain events. The certain events can include when the size of the set of digital communications offered by either of the two user accounts for exploration of relationships in the alliance has increased by a specific amount, when the set of digital communications newly includes or excludes digital communications from a specific communication account associated with either of the two user accounts or are now associated with a new selection criterion for the specific communication account, when the alliance strength of an alliance between either of the two user accounts and a third user account meets certain criteria for improvement, or when the size of the alliance network of either of the two user accounts has increased by a certain amount.

In some embodiments, the server 102 is programmed to define one or more triggers for improving a target strength, namely a relationship strength or an alliance strength. A trigger associated with a target strength can be tied to how the target strength fluctuates over a period of time. One trigger can be a continuous downward trend in the target strength over the period of time, even if the decrease is slow. Another trigger can be a sudden drop of the target strength that has not previously happened since the beginning of the period of time but persists through the end of the period of time. Any specific trend can be identified with linear regression or other trend estimation techniques known to someone skilled in the art. These triggers generally signify a non-trivial deterioration in the target strength that can benefit from a reversal. A trigger associated with a target strength can be modified to be further tied to how other target strengths fluctuate over the period of time. For example, given a continuous downward trend in the target strength of the alliance between the first user account and the second user account, a trigger may further require that the same trend is or is not observed for more than a certain number or percentage of other alliances involving either of the two user accounts.

In some embodiments, the server 102 is programmed to send to the first user account or a device associated with the first user account a notification of the occurrence of a trigger associated with an alliance or a relationship of the first user account. The notification can include information regarding the trigger, such as with which alliance or relationship the trigger is associated, when the trigger occurred, or how the trigger applied to the variation of the corresponding target strength. The server 102 can also be configured to determine an underlying reason why the trigger occurred from the set of digital communications offered by the first user account for exploration of relationships, as further discussed below, and include a description of the underlying reason in the notification. In addition, the notification can include a request for further information related to improving the corresponding target strength, such as a confirmation of receiving further notifications related to the alliance or the relationship, a confirmation of receiving a further recommendation for improving the corresponding target strength, or a specification of from which user accounts to seek assistance. In response to the notification, the server 102 can also be configured to receive certain feedback from the device associated with the first user account, such as that the trigger should not have occurred given the variation of the target strength or that the occurrence of the trigger does not need to be notified in the future. The server 102 is further programmed to perform further actions in accordance with any information or feedback received in response to the notification, such as tuning the parameters of the trigger to alter how the trigger applies or sending requests to other user accounts for contributing to improving the target strength.

In some embodiments, the server 102 is programmed to allow specification by a particular user account of various preferences or requirements related to improving relationship strengths or alliance strengths. The preferences or requirements can include, on the basis of an alliance or a relationship of the first user account, whether or when to receive notification of a change in a target strength, whether or when to receive any assistance for improving a target strength, what types of triggers to use for improving a target strength, or what types of assistance (e.g., self-help recommendations to the first user account or help requests to any other user account) to receive for improving a target strength. The preferences or requirements can also include, on the basis of a specific user account, which is a member or a contact of an alliance network of the first user account, whether or when to receive requests for contributing to improving a target strength for the first user account (e.g., depending on the frequency and volume of the digital communications shared by the specific user account for exploration of relationships during a recent period) or what types of assistance to provide (e.g., communicating with the first user account or communicating with another entity, communicating digitally or otherwise, etc.). The server 102 is programmed to perform the operations discussed herein in accordance with the specified preferences or requirements.

4.3.2 Improving Relationship Strengths or Alliance Strengths

In some embodiments, the server 102 is programmed to determine how to improve a relationship strength of the relationship between the first user account, such as 902 in FIG. 9, and the first contact in response to the occurrence of a trigger associated with the relationship strength, as discussed above. The server 102 can be configured to collect and analyze interest data related to the first user account and the first contact using an approach known to someone skilled in the art, such as the technique described in U.S. patent application Ser. No. 16/215,534, filed Dec. 10, 2018, the entire contents of which are hereby incorporated by reference. The server 102 can be configured to further evaluate prior interactions between the first user and the first contact from the set of digital communications offered by the first user account involving the first contact. When the first contact is the certain user having the certain user account, such as 906 in FIG. 9, the server 102 can be configured to further evaluate prior interactions between the first user and the first contact also based on the set of digital communications offered by the certain user account involving the first user. Based on the analysis or evaluation result, the server 102 can be configured to identify activities for the first user and the first contact to perform together. For example, when the set of digital communications offered by the first user account involving the first contact reveal that the first user and the first contact used to attend concerts together, an external source indicates that another concert will take place on a certain night, and the set of digital communications offered by the first user account further reveal that the first user is available that night, the server 102 can be configured to send a recommendation to the first user account for inviting the first contact to the concert.

In some embodiments, the server 102 can be configured to identify a specific user account such that the first user account and the first contact are each a network alliance member or network alliance contact of the specific user account. For example, referring to FIG. 9, when the first user account is 902 and the first contact is 908, the specific user account can be 906, such that 902 and 908 each is a network alliance contact of 906. The specific user account can also be 910, such that 902 is a network alliance member and 908 is a network alliance contact of 910. When then the first contact is 906 instead, the specific user account can be 910, such that 902 is a network alliance member and 906 is a network alliance contact of 910. The specific user account can also be 912, such that 906 is a network alliance member and 902 is a network alliance contact of 912. The specific user account can also be 914 such that 902 and 906 are each a network alliance contact of 904.

In some embodiments, the server 102 can be configured to further require that the specific user account meet certain conditions in terms of a first communication path between the specific user account and the first user account and a second communication path between the specific user account and the first contact, where each communication path connects the two end points through one or more alliances (within an alliance network) or a relationship (with a member of the alliance network). The certain conditions can include that no more than a certain number of triggers associated with the alliance strength of an alliance or the relationship strength of any relationship along the first or the second communication path have occurred and remained unresolved, at least a certain number of alliance strengths or relationship strength along the first or the second communication path currently exceed a specific threshold, or the number or frequency of recent digital communications offered by the specific user account for exploration of relationships exceeds a chosen threshold.

In some embodiments, the server 102 can be configured to then send a request to the specific user account or a device associated with the specific user account for contributing to improving the relationship strength of the relationship between the first user account and the first contact. The request can include various types of information, such as the identity of the first user account, the identity of the first contact, the nature of the communication path between the specific user and the first user account or the first contact, the reason for the request, a summary of topics discussed in the digital communications offered by the first account involving the first contact, or any suggested action for the specific user account. The suggested action can be sending a digital communication to the first user account or the first contact or a communication account thereof or otherwise communicate with the first user or the first contact. The digital communication or other communication can be regarding the relationship between the first user account and the first contact or regarding an interest shared between at least two of the first user account, the first contact, and the specific user account. The suggested action can also include an action that contributed to improving a relationship strength of another relationship of the first user account or a relationship strength of a relationship involving another user account for which a trigger of a similar nature occurred.

In some embodiments, the server 102 is programmed to determine how to improve a relationship strength of the relationship between the first user account and the first contact based on the nature of the trigger. For example, a trigger that corresponds to a smaller decrease in the relationship strength within a unit time might be associated with a milder remedial measure compared to a trigger that corresponds to a larger increase. Similarly, a trigger that corresponds to a slower decrease in the relationship strength over a period of time might be associated with a more persistent remedial measure compared to a trigger that corresponds to a faster decrease. In addition, depending on preferences of the first user account, a trigger associated with a particular relationship that represents a very significant opportunity might be assigned a more aggressive remedial measure than a trigger associated with another relationship.

In some embodiments, the server 102 can be programmed to increase the intensity of the remedial measure for improving the relationship strength by strengthening one of the approaches discussed in the preceding paragraphs or combining those approaches. For example, the server 102 can be configured to identify as the specific user account an alliance network member of the first user account who shares relationship information with the first user account through fewer alliances or who is also involved in those digital communications shared by the first user account for exploration of relationships involving the first contact. In selecting the specific user account, each user account can also be ranked by the types of digital communications offered by the user account for exploration of relationships, the number of alliances of the user account, the size of the alliance network of the user account, the amount of experience of the first user account in handling a trigger of a certain nature, the amount of contribution already made by the user account for improving a target strength, or the location of the user of the user account. The server 102 can also be configured to identify multiple user accounts similar to the specific user account and send a request to each of the multiple user accounts simultaneously or in a specific order for contributing to improving the relationship strength of the relationship between the first user account and the first contact. In addition, the server 102 can be configured to send a request to the specific user account that includes information regarding activities for the first user and the first contact to perform together, as noted above.

In some embodiments, the server 102 is programmed to determine how to improve an alliance strength of the alliance between the first user account and the second user account in response to the occurrence of a trigger associated with the alliance strength, as discussed above. The server 102 can be configured to send a recommendation to the first or the second user account to increase or otherwise update the types or volume of digital communications offered in the alliance between the first user account and the second user account. The server 102 can also be configured to send a recommendation to the first or the second user account to increase the degree of alliance network extended from the other user account. In addition, the server 102 can be configured to collect and analyze interest data related to the first user account and the second user account using an approach known to someone skilled in the art, such as the technique described in U.S. patent application Ser. No. 16/215,534, filed Dec. 10, 2018. The server 102 can be configured to further evaluate prior interactions between the first user and the second user from the set of digital communications offered by either of the two user accounts in the alliance. Based on the analysis or evaluation result, the server 102 can be configured to identify activities for the first user and the second user to perform together. For example, when the digital communications offered by the first user account and the second user account in one or more alliances reveal that the two users used to attend concerts together, the first user is going to another concert taking place on a certain night, and the second user is also available that night, the server 102 can be configured to send a recommendation to the first user account for inviting the second user to the concert or a recommendation to the second user account for reaching out to the first user regarding attending the concert together. For further example, when the digital communications offered by the first user account in one or more alliances reveal that the first user can benefit from an introduction to an individual and the second user account is in a communication path from the first user account to the individual, the server 102 can be configured to send a recommendation to the second user account for suggesting an introduction of the first user to the individual.

In some embodiments, the server 102 can be configured to identify a specific user account such that the first user account and the second user account are each a network alliance member or network alliance contact of the specific user account. For example, referring to FIG. 9, when the first user account is 902 and the second user account is 910, the specific account can be 904, such that 902 and 910 are each a network alliance member of 904, or the specific account can be 912, such that 902 and 910 are each a network alliance contact of 912.

In some embodiments, the server 102 can be configured to further require that the specific user account meet certain conditions in terms of a first communication path between the specific user account and the first or a second communication path between the specific user account and the second user account. The certain conditions can include that no more than a certain number of triggers associated with the alliance strength of an alliance or the relationship strength of any relationship along the first or the second communication path have occurred and remained unresolved, at least a certain number of alliance strengths or relationship strength along the first or the second communication path currently exceed a specific threshold, or the number or frequency of recent digital communications offered by the specific user account for exploration of relationships exceeds a chosen threshold. The certain conditions can further include that the specific user account has a certain number of alliances or an alliance network of a certain size or is not already contributing to improving more than a first number of target strengths associated with the first or the second user account or a second number of target strengths associated with other user accounts.

In some embodiments, the server 102 can be configured to then send a request to the specific user account for contributing to improving the alliance strength of the alliance between the first user account and the second user account. The request can include various types of information, such as the identity of the first user account, the identity of the second user account, the nature of the communication path between the specific user and the first or the second user account, the reason for the request, a summary of topics discussed in the digital communications offered by the first user account and the second user account in the alliance, or any suggested action for the specific user account. The suggested action can be sending a digital communication to the first or the second user account or otherwise communicate with the first or the second user regarding the alliance between the two user accounts. The digital communication or other communication can be regarding the alliance between the first user account and the second user account or regarding an interest shared between at least two of the first user account, the second user account, and the specific user account. The suggested action can also include an action that contributed to improving an alliance strength of another alliance of the first or the second user account or an alliance strength of an alliance of another user account for which a trigger of a similar nature occurred.

In some embodiments, the server 102 is programmed to determine how to improve an alliance strength of the alliance between the first user account and the second user account based on the nature of the trigger. For example, a trigger that corresponds to a smaller decrease in the alliance strength within a unit time might be assigned a milder remedial measure compared to a trigger that corresponds to a larger increase. Similarly, a trigger that corresponds to a slower decrease in the alliance strength over a period of time might be assigned a more persistent remedial measure compared to a trigger that corresponds to a faster decrease. In addition, depending on preferences of the first or the second user account, a trigger associated with an alliance strength, which signifies a confirmed, strong connection, might be assigned a more urgent remedial measure than a trigger associated with a relationship strength.

The server 102 can be programmed to increase the intensity of the remedial measure for improving the alliance strength by strengthening one of the approaches discussed in the preceding paragraphs or combining those approaches. For example, the server 102 can be configured to identify an alliance network member of the first or the second user account who shares relationship information with the first or the second user account through fewer alliances or who is also involved in those digital communications offered by the first user account involving the second user account or those digital communications offered by the second user account involving the first user account. In selecting the specific user account, each user account can also be ranked by the types of digital communications offered by the user account for exploration of relationships, the number of alliances of the user account, the size of the alliance network of the user account, the amount of contribution already made by the user account for improving a target strength, or the location of the user of the user account. The server 102 can also be configured to identify multiple user accounts similar to the specific user account and send a request to each of the multiple user accounts simultaneously or in a specific order for contributing to improving the alliance strength of the alliance between the first user account and the second user account. In addition, the server 102 can be configured to send a request to the specific user account that includes information regarding activities for the first user and the second user account to perform together, as noted above.

In some embodiments, the server 102 is programmed to determine how to improve an alliance strength of the alliance between the first user account and the second user account based on a potential reason for the decline of the alliance strength. The server 102 can be programmed to analyze the set of digital communications offered for exploration of relationships by the first or the second user account and identify any correlation between the decline of the alliance strength with another event. Specifically, the server 102 can be configured to detect that the decline of the alliance strength of the alliance between the first user account and the second user account follows the decline of a target strength associated with the first user account and a third user account or a specific individual that is an alliance network member or alliance network contact of the second user account. In response, the server 102 can be configured to send a recommendation to the first user account for reconnecting with the second user account once the target strength associated with the third user account or the specific individual recovers. The server 102 can also be configured to detect that the decline of the alliance strength of the alliance between the first user account and the second user account follows the loss of a particular interest, such as the closing of a gallery the first user and the second user often visited together. In response, the server 102 can be configured to send a recommendation for a similar gallery to the first or the second user account.

In some embodiments, the server 102 is programmed to take an adaptive approach in improving a target strength associated with the first user account based on how the first user account responds to recommendations for improving the target strength, how other user accounts respond to requests for contributing to improving the target strength, or how the target strength changes in response to a contribution from another user account. The server 102 can be configured initially to send recommendations to the first user account or send requests to a select set of other user accounts, and only send requests to an additional set of user accounts when a certain portion of the select set of other user accounts reject the requests, when the target strength does not reach a certain threshold after a certain period of time, when the availability of a user account in the additional set changes, or when a request for additional assistance is received from the first user account. The server 102 can also be programmed to adjust the remedial measure for improving the target strength based on how the target strength is changing. When the target strength steadily improves, the server 102 can be configured to strengthen the remedial measure for a more prominent improvement, as discussed above, such as sending a request to a user account that has a large number of alliances or has made many successful contributions for improving target strengths in the past. When the target strength fluctuates or drops even further, the server 102 can be configured to alter the remedial measure, such as switching from sending recommendations to the first user account to sending requests to other user accounts or stop working with an initial set of user accounts and sending request to a whole new set of user accounts.

5. Example Processes

Figure 8:
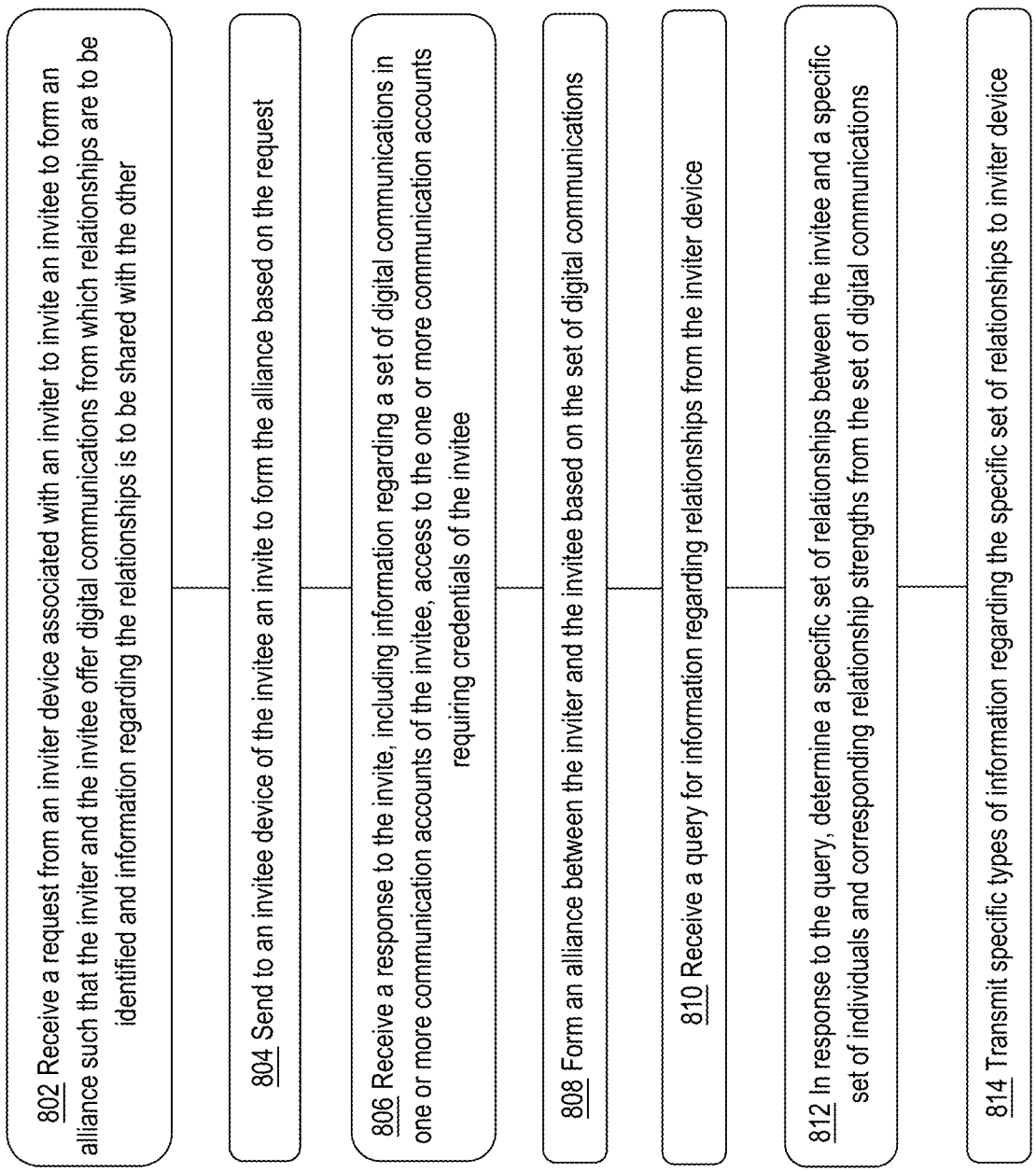
FIG. 8 illustrates an example process performed by the communication management server computer of managing alliances and associated relationship data.

FIG. 8 illustrates an example process performed by the server of managing alliances and associated relationship data alliances. FIG. 10 illustrates an example process of managing connections based on digital alliance data performed by the communication management server computer. FIG. 8 and FIG. 10 are each shown in simplified, schematic format for purposes of illustrating a clear example and other embodiments may include more, fewer, or different elements connected in various manners. FIG. 8 and FIG. 10 are each intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

Referring to FIG. 8, In some embodiments, in step 802, the server 102 is programmed or configured to receive a request from an inviter device associated with an inviter to invite an invitee to form an alliance such that the inviter and the invitee offer digital communications from which relationships are to be identified and information regarding the relationships is to be shared with the other. To form an alliance, the initial request or subsequent communications with the server 102 would include credentials for one or more communication accounts of the inviter. The initial request or subsequent communications would also include a selection criterion to be applied to the digital communications in the one or more communication accounts to form a set of digital communications unless all the digital communications in the one or more communication accounts are to be associated with the alliance by default. Furthermore, the initial request or subsequent communications would include a specification of types of information regarding relationships identified from the inviter's set of digital communications unless the name of each contact and a corresponding relationship strength are to be used by default.

In step 804, the server 102 is programmed or configured to send to an invitee device of the invitee an invitation to form the alliance based on the request. Information as to how to reach the invitee device would be included in the request unless the invitee device is already in communication with the server 102. The invitation would include at least a portion of the data in the request, and more data can be sent to the invitee device upon request. The invitation can be sent directly to the invitee device or through a communication account of the invitee.

In step 806, the server 102 is programmed or configured to receive a response to the invite. A response accepting the invitation would typically include information regarding a set of digital communications in one or more communication accounts of the invitee, access to the one or more communication accounts requiring credentials of the invitee. The response or subsequent communications with the server 102 can include the other data required for forming the alliance, similar to those sent to the server 102 by the inviter device.

In step 808, the server 102 is programmed or configured to form an alliance between the inviter and the invitee based on the set of digital communications of the inviter and the invitee. The data required for forming the alliance can be saved in a database. The set of digital communications of the inviter and the invitee can be retrieved, filtered, or mined as soon as the credentials for accessing the communication accounts of the inviter or the invitee are received, according to a specific schedule, or in response to relevant queries. In addition, the server 102 can be configured to ultimately form separate alliances between the inviter device and other devices, and similarly between the invitee device and additional devices.

In step 810, the server 102 is programmed or configured to receive a query for information regarding relationships from the inviter device. The query could also come from the invitee device, and the query processing would be the same except that the roles of the inviter and the invitee are switched. The query could be limited to relationships within certain organizations, which may correspond to prospective customers or employers of the inviter, for example.

In step 812, in response to the query, the server 102 is programmed or configured to determine a specific set of relationships between the invitee and a specific set of individuals (contacts) and corresponding relationship strengths from the set of digital communications of the invitee associated with the alliance. For example, when the invitee chats on a daily basis with a certain individual based on the set of digital communications of the invitee, the corresponding relationship strength might be relatively high. The server 102 can also be configured to determine values of various attributes of each of the specific set of contacts, such as gender, employer, title, location, organization, etc. from the digital communications with the contact, the local database, or external data sources. For example, the title of the contact might be extracted from the signature block of a digital communication of the contact. When the inviter device has formed separate alliances with other devices, the server 102 is configured to also repeat the process with the sets of digital communications of the user accounts associated with those separate alliances. The server 102 can be programmed to further aggregate data regarding the specific set of relationships by industry, organization, or distinct individual.

In step 814, the server 102 is programmed or configured to transmit specific types of information regarding the specific set of relationships to inviter device. The specific types of information by default could be the name of a contact in the relationship and the corresponding relationship, or include additional data, such as headers or summaries of the digital communications, according to the invitee's specification.

Referring to FIG. 10, in some embodiments, in step 1002, the server 102 is programmed or configured to manage a plurality of user accounts, including a first user account associated with a first user and a first user device and a second user account associated with a second user and a second user device. The first user account is associated with an alliance network comprising the second user account as an alliance network member of the first user account, where the second user account shares relationship information with the first user account through one or more alliances. Each alliance comprises two user accounts as allies of each other, each of the two user accounts offering a set of digital communications indicating relationships that can be shared with the other user account in the alliance.

In some embodiments, in step 1004, the server 102 is programmed or configured to monitor, within a time period, a target strength associated with the first user account and an entity based on the set of digital communications offered by the first user account for exploration of relationships in one or more alliances. The entity can be an ally or a contact of the first user account.

In some embodiments, in the monitoring, the server 102 is programmed or configured to compute and store a current value of the target strength when a size of the set of digital communications offered by the first user account for exploration of relationships has increased by a specific amount, when the set of digital communications newly includes or excludes digital communications from a specific communication account associated with the first user account or is now associated with a new selection criterion for the specific communication account, or when a second target strength associated with the first user account and a second entity meets a condition for improvement.

In some embodiments, in the monitoring, the server 102 is programmed or configured to identify a trend in which the target strength varies within the time period and determine whether the trend matches one of a plurality of triggers for improving the target strength. The server 102 can be configured to further determine whether the trend is observed with a second target strength associated with the first user account and a second entity.

In some embodiments, the server 102 is programmed or configured to identify one or more interests of the first user from the set of digital communications. The server 102 is programmed to also identify one or more prior activities performed together by the first user and the entity further from the set of digital communications. Furthermore, the server 102 is programmed to determine a recommendation to a specific user account of the plurality of user accounts that can contribute to improving the target relationship based on the one or more interests or one or more prior activities.

In some embodiments, in step 1006, the server 102 is programmed or configured to transmit to the first user device a notification of a result of the monitoring, to the first user device a recommendation for improving the target strength based on the result of the monitoring, or to the specific user account a request for contributing to improving the target strength based on the result of the monitoring.

In some embodiments, the notification can include a request for a confirmation of receiving a further recommendation for improving the target strength or a specification of from which user accounts to seek assistance with improving the target strength.

In some embodiments, the server 102 is programmed or configured to determine that the specific user account meets certain conditions in terms of a first communication path between the specific user account and the first user account and a second communication path between the specific user account and the entity. Each of the first communication path and the second communication path connects two end points through at least one alliance or a relationship based on a group of digital communications offered for exploration of relationships in the at least one alliance.

In some embodiments, the request to the specific user account can include information regarding the first communication path or the second communication path, a summary of topics discussed in the digital communications offered by the first user account involving the entity, or one or more suggested actions for the specific user account.

In some embodiments, the certain conditions to be met by the specific user account can include that no more than a certain number of triggers associated with an alliance strength of an alliance or a relationship strength of any relationship along the first communication path or the second communication path have occurred and remained unresolved. The certain conditions can include that at least a certain number of alliance strengths of the at least one alliance and relationship strength of any relationship along the first communication path or the second communication path currently exceed a specific threshold. In addition, the certain condition can include that a number or frequency of recent digital communications offered during a certain period of time by the specific user account for exploration of relationships exceeds a chosen threshold.

In some embodiments, the server 102 is programmed or configured to determine one or more actions to suggest to the specific user account, including sending a digital communication to the first user account or a communication account associated with the entity regarding an interest shared between at least two of the first user account, the entity, and the specific user account or regarding a certain action taken to improve another target strength associated with the first user account or the entity or being triggered by an identical or a similar trigger as improving the target strength.

In some embodiments, the server 102 is programmed or configured to receive from the first user account one or more preferences related to, whether or when to receive any notification of a change in a target strength associated with an alliance or a relationship of the first user account, whether or when to receive any assistance for improving the target strength, or what types of assistance to receive for improving the target strength. The server 102 is programmed to further perform the transmitting based on the preferences.

6. Hardware Implementation

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
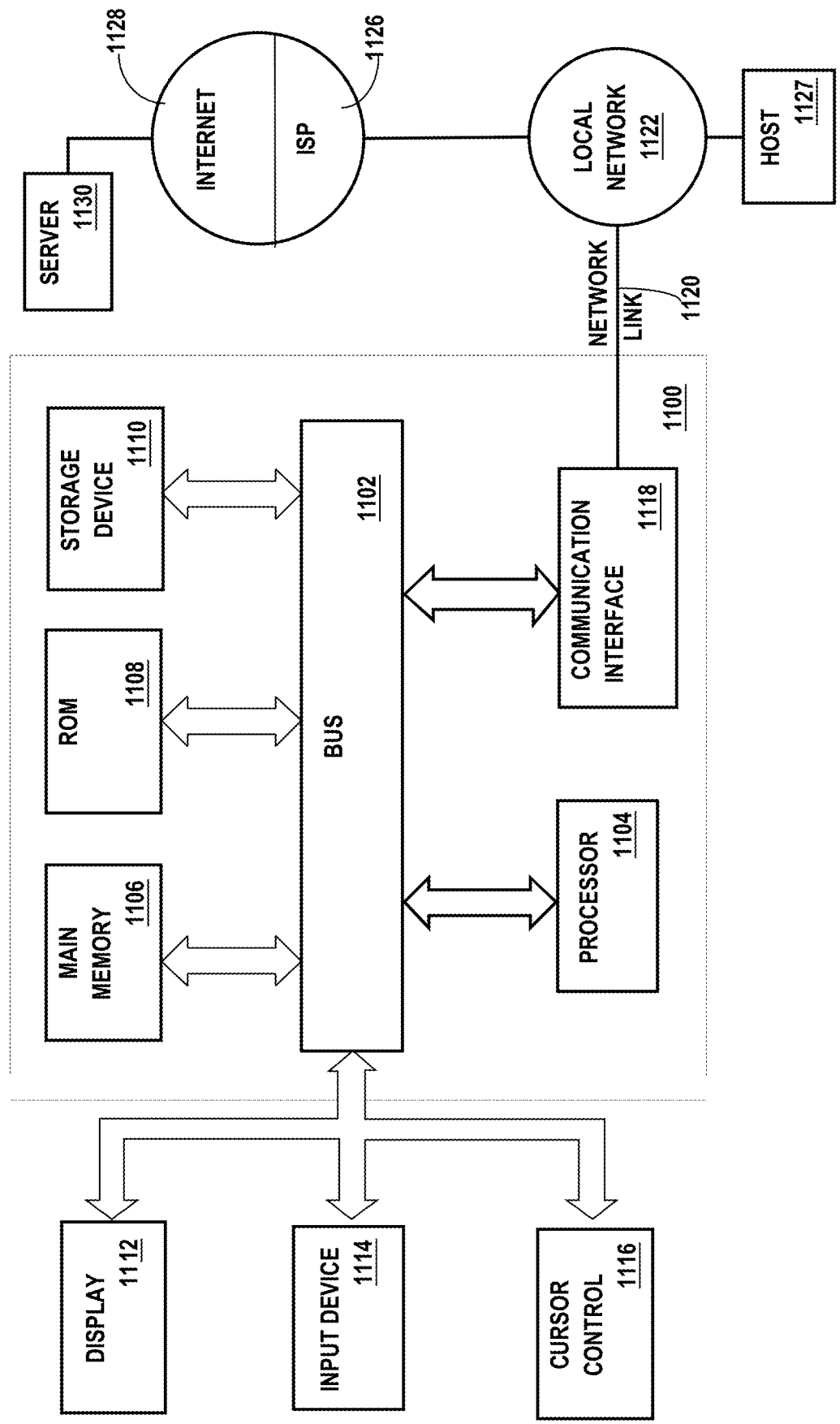
FIG. 11 is a block diagram that illustrates a computer system upon which an embodiment of the invention may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of managing digital communication access based on digital alliance data, comprising:

managing, by a processor, a plurality of user accounts, including a first user account associated with a first user and a first user device and a second user account associated with a second user and a second user device, the first user account being associated with an alliance network comprising the second user account as an alliance network member of the first user account, the second user account sharing relationship information with the first user account through one or more alliances, each alliance comprising two user accounts as allies of each other, each of the first user account and the second user account offering a set of digital communications from a communication account to at least one other communication account, the communication account being associated with the user account but external to the plurality of user accounts, the set of digital communications being inaccessible to the other user account prior to forming the alliance and indicating relationship information associated with the at least one other communication account to be shared with the other user account after the alliance is formed;

monitoring, within a time period, a target strength associated with the first user account and an entity based on the set of digital communications offered by the first user account for exploration of relationships in one or more alliances;

transmitting to the first user device a notification of a result of the monitoring, including a recommendation for improving the target strength based on the result of the monitoring, or to a specific user account of the plurality of user accounts a request for contributing to improving the target strength based on the result of the monitoring, the specific user account meeting certain conditions in terms of a first communication path between the specific user account and the first user account and a second communication path between the specific user account and the entity, each of the first communication path and the second communication path connecting two end points through at least one alliance or a relationship based on a group of digital communications offered for exploration of relationships in the at least one alliance, the certain conditions including that no more than a certain number of triggers associated with an alliance strength of an alliance or a relationship strength of any relationship along the first communication path or the second communication path have occurred and remained unresolved, or at least a certain number of alliance strengths of the at least one alliance and relationship strength of any relationship along the first communication path or the second communication path currently exceed a specific threshold.

2. The computer-implemented method of claim 1, the entity being an ally or a contact of the first user account.

3. The computer-implemented method of claim 1, the monitoring comprising computing and storing a current value of the target strength when a size of the set of digital communications offered by the first user account for exploration of relationships has increased by a specific amount, when the set of digital communications newly includes or excludes digital communications from a specific communication account associated with the first user account or is now associated with a new selection criterion for the specific communication account, or when a second target strength associated with the first user account and a second entity meets a condition for improvement.

4. The computer-implemented method of claim 1, the monitoring comprising:
   identifying a trend in which the target strength varies within the time period;
   determining whether the trend matches one of a plurality of triggers for improving the target strength.

5. The computer-implemented method of claim 4, the monitoring further comprising determining whether the trend is observed with a second target strength associated with the first user account and a second entity.

6. The computer-implemented method of claim 1, the notification including a request for a confirmation of receiving a further recommendation for improving the target strength or a specification of from which user accounts to seek assistance with improving the target strength.

7. The computer-implemented method of claim 1, further comprising:
   identifying one or more interests of the first user from the set of digital communications;
   identifying one or more prior activities performed together by the first user and the entity further from the set of digital communications;
   determining the recommendation before the transmitting based on the one or more interests or one or more prior activities.

8. The computer-implemented method of claim 1, the certain conditions including that a number or frequency of recent digital communications offered during a certain period of time by the specific user account for exploration of relationships exceeds a chosen threshold.

9. The computer-implemented method of claim 1, the request including information regarding the first communication path or the second communication path, a summary of topics discussed in the digital communications offered by the first user account involving the entity, or one or more suggested actions for the specific user account.

10. The computer-implemented method of claim 1, further comprising determining one or more actions to suggest to the specific user account, including sending a digital communication to the first user account or a communication account associated with the entity regarding an interest shared between at least two of the first user account, the entity, and the specific user account or regarding a certain action taken to improve another target strength associated with the first user account or the entity or being triggered by an identical or a similar trigger as improving the target strength.

11. The computer-implemented method of claim 1, further comprising:
   receiving from the first user account one or more preferences related to, whether or when to receive any notification of a change in a target strength associated with an alliance or a relationship of the first user account, whether or when to receive any assistance for improving the target strength, or what types of assistance to receive for improving the target strength,
   the transmitting being performed based on the one or more preferences.

12. One or more non-transitory storage media storing instructions which, when executed by one or more computing devices, cause performance of a method of managing digital communication access based on digital alliance data, the method comprising:
   managing a plurality of user accounts, including a first user account associated with a first user and a first user device and a second user account associated with a second user and a second user device,
   the first user account being associated with an alliance network comprising the second user account as an alliance network member of the first user account, the second user account sharing relationship information with the first user account through one or more alliances,
   each of the first user account and the second user account offering a set of digital communications from a communication account to at least one other communication account, the communication account being associated with the user account but external to the plurality of user accounts, the set of digital communications being inaccessible to the other user account prior to forming the alliance and indicating relationship information associated with the at least one other communication account to be shared with the other user account after the alliance is formed;
   monitoring, within a time period, a target strength associated with the first user account and an entity based on the set of digital communications offered by the first user account for exploration of relationships in one or more alliances;
   transmitting to the first user device a notification of a result of the monitoring, including a recommendation for improving the target strength based on the result of the monitoring, or to a specific user account of the plurality of user accounts a request for contributing to improving the target strength based on the result of the monitoring,
   the specific user account meeting certain conditions in terms of a first communication path between the specific user account and the first user account and a second communication path between the specific user account and the entity,
   each of the first communication path and the second communication path connecting two end points through at least one alliance or a relationship based on a group of digital communications offered for exploration of relationships in the at least one alliance, the certain conditions including that no more than a certain number of triggers associated with an alliance strength of an alliance or a relationship strength of any relationship along the first communication path or the second communication path have occurred and remained unresolved, or at least a certain number of alliance strengths of the at least one alliance and relationship strength of any relationship along the first communication path or the second communication path currently exceed a specific threshold.

13. The one or more non-transitory storage media of claim 12, the monitoring comprising computing and storing a current value of the target strength when a size of the set of digital communications offered by the first user account for exploration of relationships has increased by a specific amount, when the set of digital communications newly includes or excludes digital communications from a specific communication account associated with the first user account or is now associated with a new selection criterion for the specific communication account, or when a second target strength associated with the first user account and a second entity meets a condition for improvement.

14. The one or more non-transitory storage media of claim 12, the monitoring comprising:
   identifying a trend in which the target strength varies within the time period;
   determining whether the trend matches one of a plurality of triggers for improving the target strength.

15. The one or more non-transitory storage media of claim 12,
   the relationship information identifying a certain private communication account of a certain user different from the first user or the second user,
   the relationship information being shared via a search of the set of digital communications.

16. The one or more non-transitory storage media of claim 12, the method further comprising:
   identifying one or more interests of the first user from the set of digital communications;
   identifying one or more prior activities performed together by the first user and the entity further from the set of digital communications;
   determining the recommendation before the transmitting based on the one or more interests or one or more prior activities.

17. The one or more non-transitory storage media of claim 12, the method further comprising determining one or more actions to suggest to the specific user account, including sending a digital communication to the first user account or a communication account associated with the entity regarding an interest shared between at least two of the first user account, the entity, and the specific user account or regarding a certain action taken to improve another target strength associated with the first user account or the entity or being triggered by an identical or a similar trigger as improving the target strength.

18. The one or more non-transitory storage media of claim 12, the method further comprising:
   receiving from the first user account one or more preferences related to, whether or when to receive any notification of a change in a target strength associated with an alliance or a relationship of the first user account, whether or when to receive any assistance for improving the target strength, or what types of assistance to receive for improving the target strength,
   the transmitting being performed based on the preferences.

19. The one or more non-transitory storage media of claim 12, the certain conditions including that a number or frequency of recent digital communications offered during a certain period of time by the specific user account for exploration of relationships exceeds a chosen threshold.

* * * * *